United States Patent
Zhong et al.

(10) Patent No.: US 10,620,966 B2
(45) Date of Patent: Apr. 14, 2020

(54) METHOD TO COORDINATE SYSTEM BOOT AND RESET FLOWS AND IMPROVE RELIABILITY, AVAILABILITY AND SERVICEABILITY (RAS) AMONG MULTIPLE CHIPSETS

(71) Applicant: Intel Corporation, Santa Clara, CA (US)

(72) Inventors: Tina C. Zhong, Portland, OR (US); Russell J. Wunderlich, Livermore, CO (US); Chih-Cheh Chen, Portland, OR (US); Malay Trivedi, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 209 days.

(21) Appl. No.: 15/719,340

(22) Filed: Sep. 28, 2017

(65) Prior Publication Data

US 2019/0095224 A1    Mar. 28, 2019

(51) Int. Cl.
*G06F 9/4401* (2018.01)
*G06F 1/24* (2006.01)

(52) U.S. Cl.
CPC .............. *G06F 9/4418* (2013.01); *G06F 1/24* (2013.01)

(58) Field of Classification Search
None
See application file for complete search history.

(56) References Cited

U.S. PATENT DOCUMENTS

| | | | | |
|---|---|---|---|---|
| 6,711,639 B1* | 3/2004 | Singer | ................. | G06F 13/4086 710/100 |
| 8,698,543 B1* | 4/2014 | Dribinsky | ........... | G06F 13/4077 327/333 |
| 2008/0091863 A1* | 4/2008 | Kim | ......................... | G06F 1/24 710/110 |
| 2010/0080272 A1* | 4/2010 | Kwa | ..................... | G06F 1/3209 375/222 |
| 2014/0258738 A1* | 9/2014 | Greenwalt | ............ | G06F 1/3206 713/300 |

* cited by examiner

*Primary Examiner* — Paul Yen
(74) *Attorney, Agent, or Firm* — Nicholson De Vos Webster & Elliott, LLP

(57) ABSTRACT

Embodiments disclosed herein relate to coordinated system boot and reset flows and improve reliability, availability, and serviceability (RAS) among multiple chipsets. In an example, a system includes a master chipset having multiple interfaces, each interface to connect to one of a processor and a chipset, at least one processor connected to the master chipset, at least one non-master chipset connected to the master chipset, and a sideband messaging channel connecting the master chipset and the non-master chipsets, wherein the master chipset is to probe a subset of its multiple interfaces to discover a topology of connected processors and non-master chipsets, and use the sideband messaging channel to coordinate a synchronized boot flow.

16 Claims, 17 Drawing Sheets

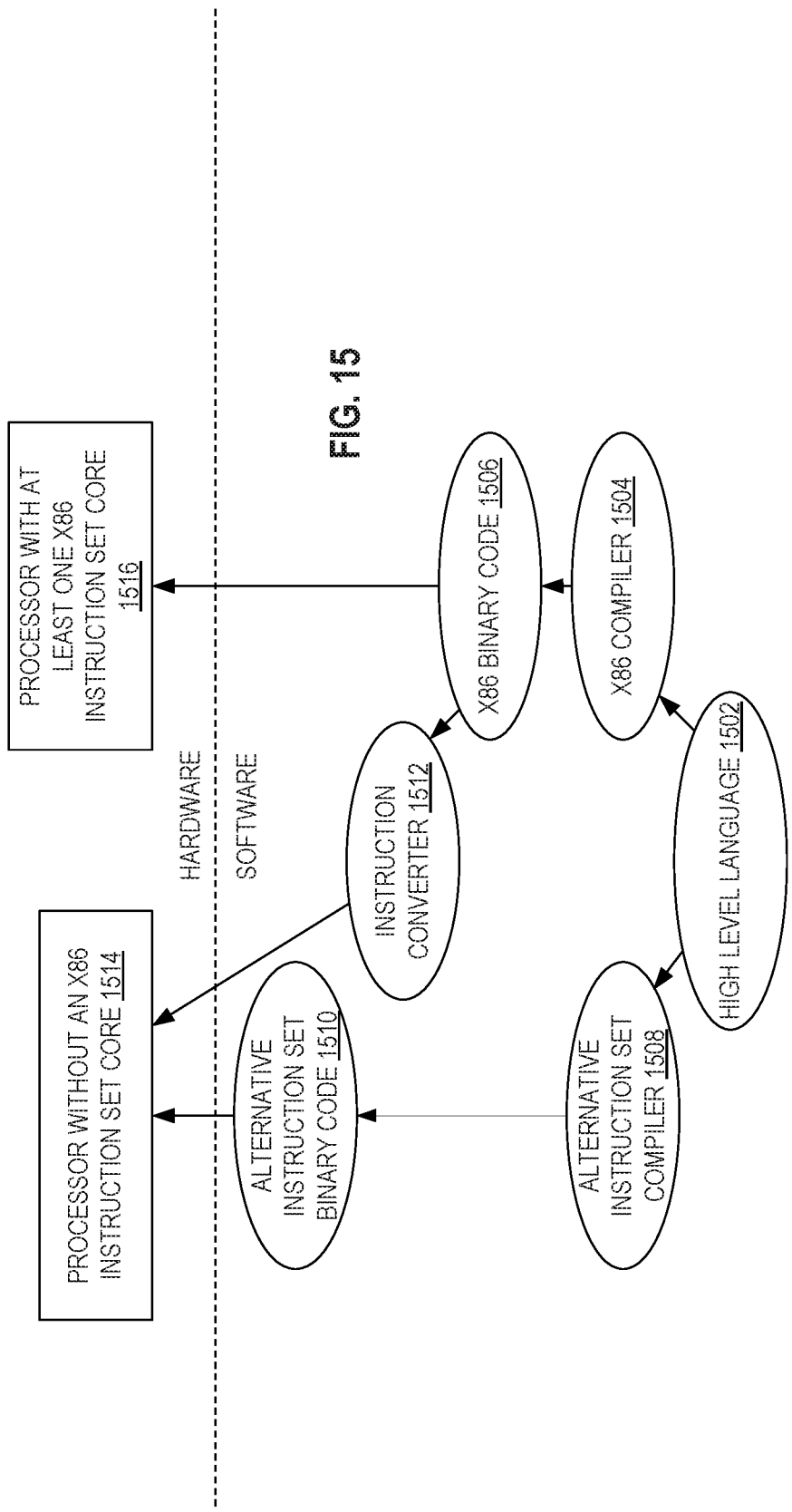

METHOD TO COORDINATE SYSTEM BOOT AND RESET FLOWS AND IMPROVE RELIABILITY, AVAILABILITY AND SERVICEABILITY (RAS) AMONG MULTIPLE CHIPSETS

FIELD OF INVENTION

The field of invention relates generally to computer processor architecture, and, more specifically, to a method to coordinate system boot and reset flows and improve reliability, availability, and serviceability (RAS) among multiple chipsets.

BACKGROUND

A server platform is a collection of computer servers that supplies server functionality beyond the capability of a single machine. A server platform can consist of hundreds or even thousands of processors, each performing some dedicated functions. Server farm processors are sometimes grouped into partitions, each partition consisting of a chipset and multiple processors. In such configurations, the chipset is responsible for management and control of the processors in the partition.

Occasionally, a processor or a chipset in the server farm encounters a reset scenario. For example, a processor enters into some undefined state and stops responding. In some situations, such a processor drives a reset pin that is shared by other processors and chipsets. But after driving the reset pin, the processor does not receive any feedback or awareness of how other processors and chipsets are responding. Such an open-loop control system is unpredictable and unreliable, and can compromise reliability, availability, and serviceability (RAS) goals of the server platform.

BRIEF DESCRIPTION OF THE DRAWINGS

The present invention is illustrated by way of example and not limitation in the figures of the accompanying drawings, in which like references indicate similar elements and in which:

FIG. 11 shown a block diagram of a system in accordance with one embodiment of the present invention;

FIG. 12 is a block diagram of a first more specific exemplary system in accordance with an embodiment of the present invention;

FIG. 13 is a block diagram of a second more specific exemplary system in accordance with an embodiment of the present invention;

FIG. 14 is a block diagram of a System-on-a-Chip (SoC) in accordance with an embodiment of the present invention; and FIG. 15 is a block diagram contrasting the use of a software instruction converter to convert binary instructions in a source instruction set to binary instructions in a target instruction set according to embodiments of the invention.

DETAILED DESCRIPTION

Figure 1:
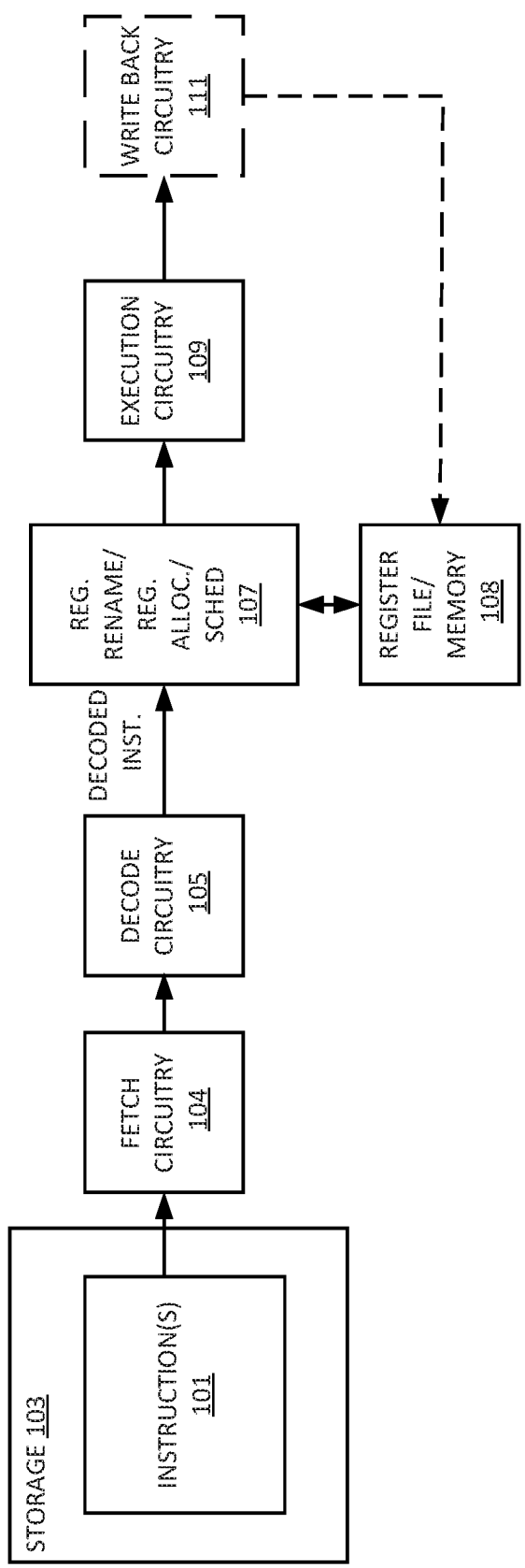
FIG. 1 is a block diagram illustrating processing components for a computing system to participate in coordinated system boot and reset flows with improved RAS, according to an embodiment.

In the following description, numerous specific details are set forth. However, it is understood that embodiments of the invention may be practiced without these specific details. In other instances, well-known circuits, structures and techniques have not been shown in detail in order not to obscure the understanding of this description.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

In the following description, methods, configurations, and related apparatuses are disclosed in which a server platform contains multiple partitions, each having a chipset and one or more processors. The processors and chipsets are connected by interconnect fabrics including standard interfaces, and a sideband messaging channel connects the multiple chipsets. Using the sideband messaging channel, one of the multiple chipsets, a master chipset, coordinates boot and reset flows in a closed-loop fashion that helps to standardize response timing, reduce surprise resets, and improve reliability, availability, and serviceability (RAS).

Problems Addressed by Disclosed Embodiments

Disclosed embodiments do not use an open-loop control mechanism consisting of a given chipset just setting a control line to other chipsets and proceeding without regard to the other chipsets' responses or readiness to proceed. For a variety of reasons, one or more of the other chipsets may be stalled, or require a long time to prepare to proceed. In disclosed embodiments, the given chipset does not proceed with a boot or reset until other chipsets are ready, and thus helps to achieve a more robust system with more predictable timing and RAS.

In the case of booting the server platform from a sleep state, for example, disclosed embodiments do not allow a waking chipset to just broadcast a wake signal to the other chipsets and then deassert its own partition's reset signal, without regard to the other chipsets' responses, which, considering that one or more of the other chipsets can be delayed in waking, can lead to unpredictable system-wide timing, system instability, and increased debug requirements. Instead, in disclosed embodiments, the waking chipset sends a wake request to the master chipset, which in turn uses the sideband messaging channel to request the other chipsets to prepare to wake. In some embodiments, the master chipset also sends the wake signal to the chipset that sent the initial wake request. The master chipset then waits for all chipsets to signal their readiness before synchronously signaling all the chipsets to wake. In some embodiments, the master chipset awaits its own readiness to reset before synchronously signaling all the chipsets to wake. Ultimately, in some embodiments, each chipset wakes its partition by deasserting its reset signal.

In the case of a graceful, synchronized reset of the system from a running state, for example, in some disclosed embodiments, a resetting chipset sends a reset request and a reset type to the master chipset. In some embodiments, the reset type is used to choose among various reset types, including reset without power cycle, reset with power cycle, and reset with power down. The master chipset in such embodiments signals the same reset type to the other chipsets, which causes the other chipsets to prepare to reset. The master chipset waits for all chipsets to signal their readiness, then synchronously signals all the chipsets to reset. Ultimately, in some embodiments, each chipset resets its partition by asserting its reset signal.

In some embodiments, an ungraceful reset is supported. For example, an ungraceful reset may occur when the requesting chipset is itself undergoing something unexpected. In this case, timing may be critical and may not allow for coordination by the master chipset. Still, in such embodiments, the requesting chipset tries to warn the other chipsets by using the sideband messaging channel to inform the other chipsets of an imminent, ungraceful request. Such a warning may improve the predictability and timing, even of an ungraceful reset. Upon receipt of the warning, each of the other chipsets quickly prepares to reset. In some embodiments, each of the other chipsets attempts to save its execution state before the imminent reset. In some embodiments, each of the other chipsets attempts to retire or salvage execution results before the imminent reset. In some embodiments, each of the other chipsets attempts to salvage data stored in memory and registers before the imminent reset. Ultimately, in such embodiments, the chipsets re-synchronize after waking.

Accordingly, embodiments disclosed herein improve the predictability of timing of how the system will behave under boot and reset scenarios, reducing ambiguity and unpredictability that can cause instability. Disclosed embodiments also simplify and standardize design rules for a multi-partition server platform.

Server Platform

FIG. 1 is a block diagram illustrating processing components for a computing system to participate in coordinated system boot and reset flows with improved RAS, according to an embodiment. In embodiments of systems that contain exactly one partition, the boot and reset flows are partition-wide flows. As illustrated, storage 103 stores instructions 101 to be executed.

Each instruction is received by fetch circuitry 104 and then by decode circuitry 105. For example, the decode circuitry 105 receives the instruction 101 from fetch circuitry 104. The instruction 101 includes fields for an opcode (such as monitor), and may have additional source and/or destination operands. More detailed embodiments of at least one instruction format will be detailed later. The decode circuitry 105 decodes the fetched instruction into one or more operations. In some embodiments, this decoding includes generating a plurality of micro-operations to be performed by execution circuitry 109. The decode circuitry 105 also decodes instruction prefixes and suffixes (if used).

In some embodiments, register renaming, register allocation, and/or scheduling circuitry 107 provides functionality for one or more of: 1) renaming logical operand values to physical operand values (e.g., a register alias table in some embodiments), 2) allocating status bits and flags to the decoded instruction, and 3) scheduling the decoded instruction for execution on execution circuitry out of an instruction pool (e.g., using a reservation station in some embodiments).

Registers (such as included in register architecture 1100, described below) and/or memory 108 store data as operands of the instruction to be operated on by execution circuitry. Exemplary register types include packed data registers, general purpose registers, and floating point registers.

In some embodiments, write back circuitry 111 writes execution results back to register file/memory 108. Write back circuit 111 is indicated as optional with dashed borders, at least insofar as the write back may occur at a different time, or not at all.

The processors and computing systems utilized in disclosed embodiments are described further below, including with respect to FIGS. 10-15.

Figure 2:
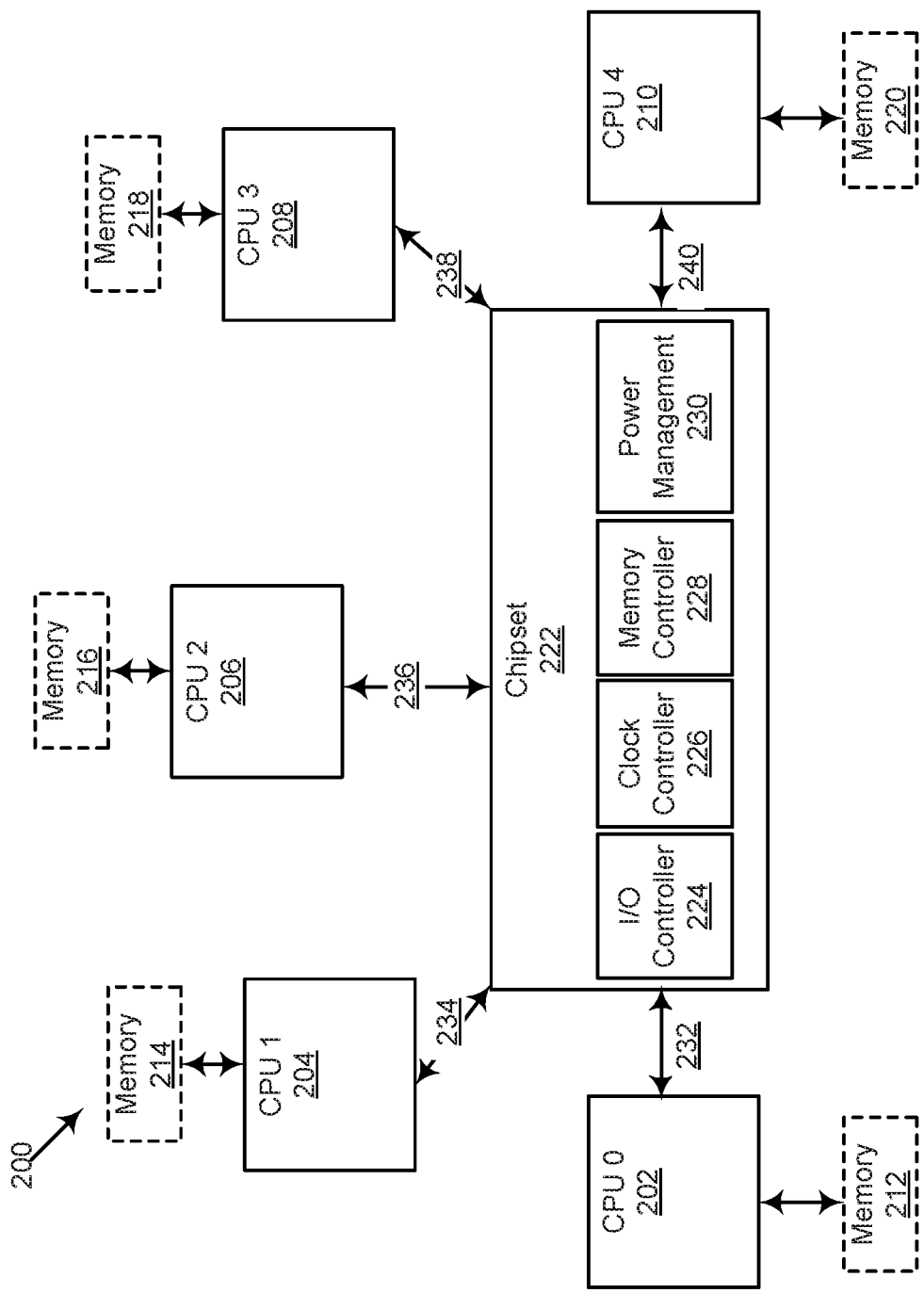
FIG. 2 is a block diagram illustrating an unpartitioned server platform, according to an embodiment.

FIG. 2 is a block diagram illustrating an unpartitioned server platform, according to an embodiment. As shown, server platform 200 includes central processing units CPU0-CPU4, labeled as 202, 204, 206, 208, and 210, coupled to memories 212, 214, 216, 218, and 220, respectively, and also coupled to chipset 222 via CPU interfaces 232, 234, 236, 238, and 240, respectively.

In some embodiments, the memories are coupled to the CPUs using a standard interface. Memory 212, for example, can be coupled to CPU 202 using any one of a double data rate (DDR) interface, any of its successors, DDR2, DDR3, DDR4, and a graphics DDR (GDDR) interface. The DDR specifications are industry-standard specifications insofar as they were defined and promulgated by the JEDEC Solid State Technology Association, and adopted in the industry. Other standard memory interfaces may be used, without limitation. In some embodiments, the CPU and its memory are coupled via a proprietary interface. As shown, the memories have dashed borders to indicate that they are optional, insofar as a given CPU may not have any external memory.

Chipset 222 controls and is coupled to the CPUs via CPU interfaces 232, 234, 236, 238, and 240. The CPU interfaces in some embodiments are industry-standard front-side-busses having data transfer rates ranging between 100 MHz and 1033 MHz, without limitation. In some embodiments, the CPU interfaces use a proprietary interface.

In some embodiments, CPUs 202, 204, 206, 208, and 210 are each disposed in a CPU socket on a printed circuit board (PCB), which can be a motherboard. A PCB may have 1, 2, 4, 8, or more sockets to house CPUs. In some embodiments, each of the sockets is coupled to the chipset via a bi-directional serial interface. In some embodiments, chipset 222 supports up to 8 interfaces, each used to connect to another chipset or to a processor. By using standard interfaces, disclosed embodiments provide an advantage that a server platform can be assembled using off-the-shelf components, like memory chips, that use the standard interface.

Chipset 222 includes input/output (I/O) controller 224, clock controller 226, and memory controller 228, and connects to and transfers data between the processors, memory, high-speed I/O such as PCI Express, and to the I/O controller. I/O controller 224 connects to lower-speed I/O, such as hard discs, PCI slots, USB and Ethernet. Chipset 222 further includes power management 230. In some embodiments, chipset 222 implements a wide variety of control features, including managing system state transitions of the server platform 200 and its interactions with other chipsets. In some embodiments, chipset 222 provides management, monitoring, and control of the CPUs.

Embodiments of CPUs 202, 204, 206, 208, and 210 are further described below, including with respect to FIGS. 10-15.

Figure 3:
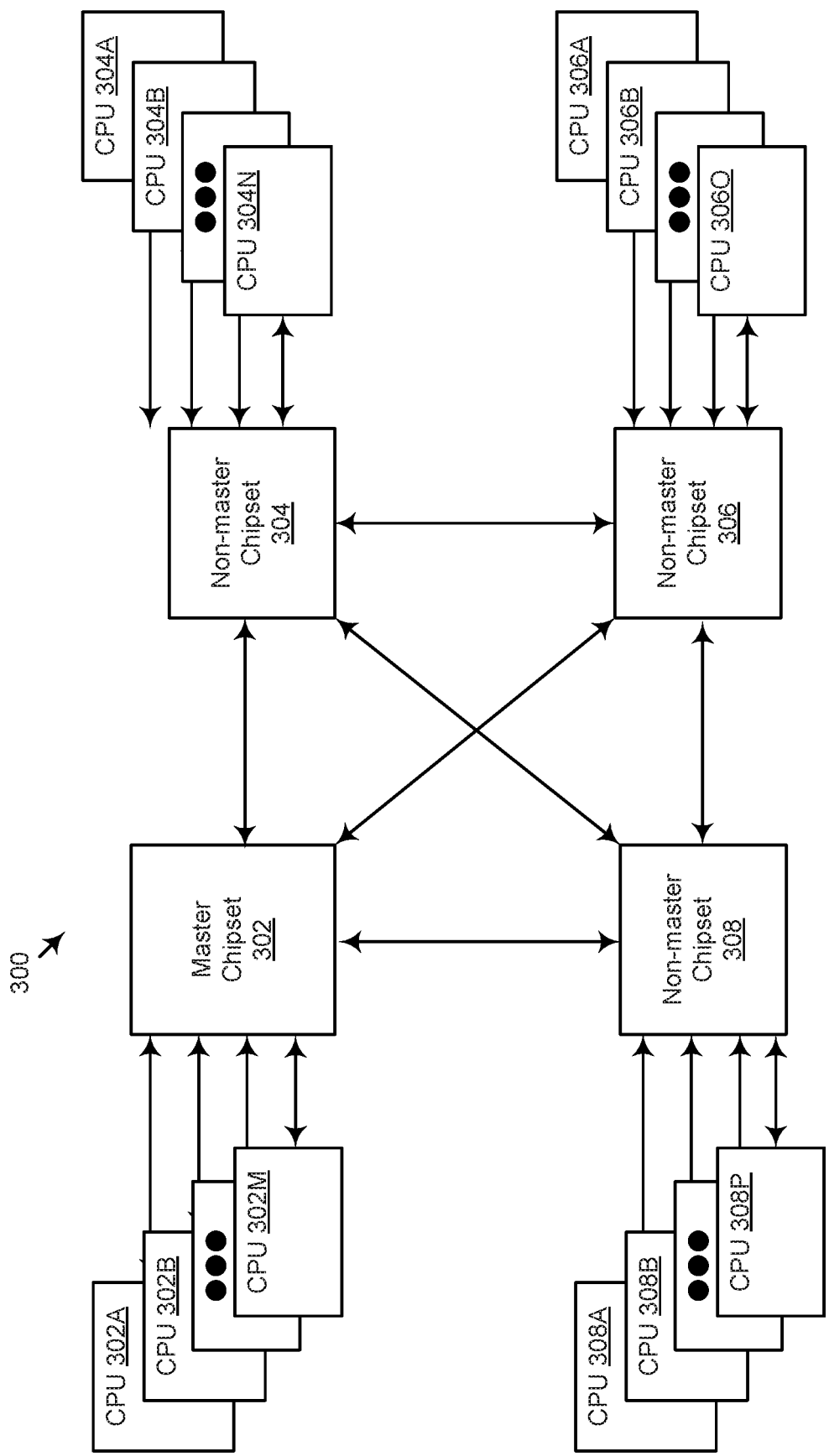
FIG. 3 is a block diagram illustrating a partitioned server platform including a plurality of chipsets to participate in coordinated system boot and reset, according to an embodiment.

FIG. 3 is a block diagram illustrating a partitioned server platform including a plurality of chipsets to participate in coordinated system boot and reset, according to an embodiment. As shown, server platform 300 includes master chipset 302 and non-master chipsets 304, 306, and 308, which are coupled to each other and to CPUs 302A-M, 304A-N, 306A-O, and 308A-P, respectively. The illustrated chipsets and CPUs operate similarly to the chipset and CPUs described above.

In operation, master chipset 302 coordinates partition-wide boots and resets. In an embodiment of booting the partition from a sleep state, for example, any one of non-master chipsets 304, 306, and 308 and CPUs 304A-N, 306A-O, and 308A-P detects a wake event and causes a wake request to be sent to the master chipset 302 using a sideband messaging channel described further below. In turn, master chipset 302 uses the sideband messaging channel to request all non-master chipsets 304, 306, and 308, to prepare to wake. When all of the non-master chipsets 304, 306, and 308, use the sideband messaging channel to acknowledge their readiness to wake, master chipset 306 uses the sideband messaging channel to instruct each of the other chipsets and its associated CPUs to wake, for example by deasserting a reset line running between them. With this boot flow, which is discussed further below, the partition-wide boot timing tends toward being standardized and predictable.

In operation, in an embodiment of resetting the partition from a running state, one of non-master chipsets 304, 306, and 308 encounters a reset scenario and uses the sideband messaging channel to send a request to master chipset 302 to coordinate a partition-wide reset. The reset request also includes a reset type, such as reset without power cycle, reset with power cycle, and reset with power down. Master chipset 302 then uses the sideband messaging channel to request all non-master chipsets, 304, 306, and 308, to prepare to reset with the requested reset type. When all of the other chipsets use the sideband messaging channel to acknowledge their readiness to reset, master chipset 302 uses the sideband messaging channel to instruct non-master chipsets 304, 306, and 308 to reset their partition, for example by asserting their reset lines. With this reset flow, which is discussed further below, the partition-wide reset timing tends toward being standardized and predictable.

Accordingly, embodiments disclosed herein improve the predictability of timing of how the system will behave under boot and reset scenarios, reducing ambiguity and unpredictability that can cause instability. Disclosed embodiments also simplify and standardize design rules for a multi-partition server platform.

Similar to FIG. 2, in some embodiments, the various components of server platform 300 are coupled using one or more standard interfaces. For example, in some embodiments, one or more of CPUs 302A-M, 304A-N, 306A-O, and 308A-P are coupled to their associated memories using one or more of DDR, DDR2, DDR3, DDR4, and GDDR. In some embodiments, one or more of master chipset 302 and non-master chipsets 304, 306, and 308 are coupled to their associated CPUs using a standard front-side bus (FSB). By using standard interfaces, disclosed embodiments provide an advantage that a server platform can be assembled using off-the-shelf components, like memory chips, that use the standard interface.

In some embodiments, master chipset 302 and non-master chipsets 304, 306, and 308 and their associated CPUs are disposed on a single printed circuit board (PCB). In some embodiments, master chipset 302 and non-master chipsets 304, 306, and 308 are disposed on different PCBs.

In some embodiments, the topology of a partition can be modified. In some embodiments, for example, a PCB includes a fixed number of sockets, each of which can accommodate either a chipset or a CPU. Such a partition includes one master chipset and at least one CPU. At boot time, the master chipset recognizes that it is the master, communicates with the other sockets to discover the topology of the partition, and conducts reset and boot flows with non-master chipsets according to embodiments disclosed herein. In some embodiments, one or more jumpers on the PCB are used to specify the master chipset.

In an embodiment with a non-partitioned topology, for example, a chipset has eight interfaces, which can be used to address up to eight CPUs, and the PCB includes nine sockets, one of which is used to house a master chipset and the other eight to house CPUs.

In an embodiment of a partitioned server platform, for example, a master chipset uses four of its eight interfaces to connect to four non-master chipsets, and uses the other four of its eight interfaces to connect with four CPUs. In some embodiments, a PCB includes nine sockets, one of which houses a master chipset, four of which house non-master chipsets, and the other four of which house CPUs. At boot time, the master chipset communicates with the other sockets to discover the topology of the partitioned server platform.

In other embodiments, without limitation, a chipset has more or fewer than eight interfaces, and a PCB includes more or fewer than nine sockets.

Embodiments of CPUs 302A-M, 304A-N, 306A-O, and 308A-P, and system 300 are further described below, including with respect to FIGS. 10-15.

Figure 4:
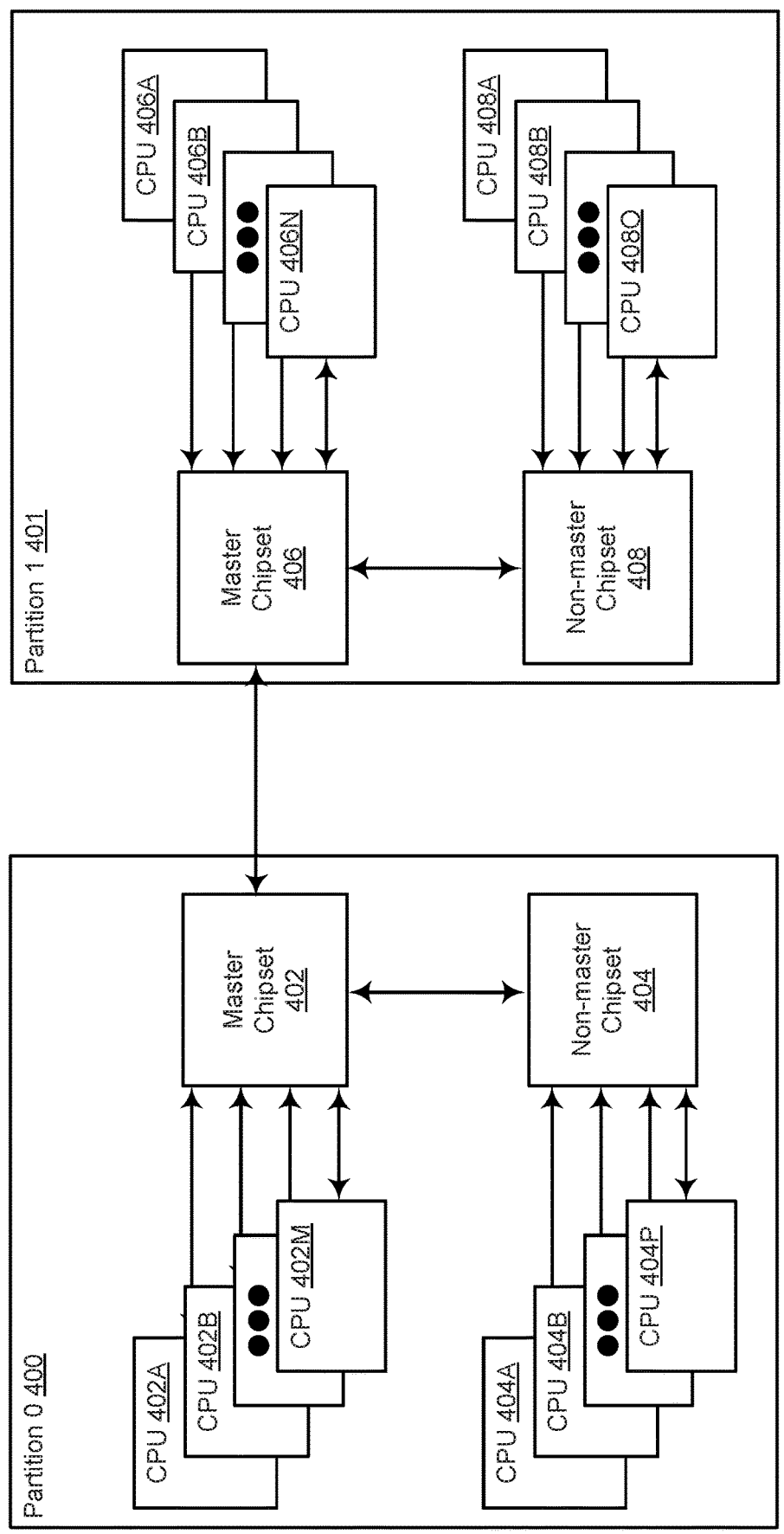
FIG. 4 is a block diagram illustrating a multiple-parallel-partitioned server platform including a plurality of chipsets to participate in coordinated system boot and reset, according to an embodiment.

FIG. 4 is a block diagram illustrating a multiple-parallel-partitioned server platform including a plurality of chipsets to participate in coordinated system boot and reset, according to an embodiment. As shown, the server platform embodies a parallel topology that includes partition 0 400 and partition 1 401. Partition 0 400 includes master chipset 402 and its associated CPUs 402A-M, and non-master chipset 404 and its associated CPUs 404A-P. Partition 1 401 includes master chipset 406 and its associated CPUs 406A-N and non-master chipset 408 and its associated CPUs 408A-O. As shown, each partition includes exactly one master chipset and at least one CPU. In operation, the master chipset on each partition coordinates reset and boot flows with the non-master chipsets on the partition. For example, master chipset 402 coordinates reset and boot flows with non-master chipset 404.

In some embodiments, partition 0 400 and partition 1 401 are disposed on different PCBs, each PCB including a fixed number of sockets that can each accommodate either a chipset or a CPU. In some embodiments, a chipset is inserted into one of the sockets on each PCB and a jumper is used to specify it as the master chipset, and the other sockets house at least one CPU and additional chipsets or CPU. In some embodiments, a partition includes a master chipset coupled to at least one CPU. At boot time, the master chipset in each partition recognizes that it is the master, communicates with the other sockets to discover the topology of the partition, and conducts reset and boot flows with non-master chipsets according to embodiments disclosed herein. In some embodiments of server platforms consisting of multiple, parallel partitions, each partition includes exactly one master chipset. In some embodiments of server platforms consisting of multiple, parallel partitions, exactly one of the multiple partitions includes a master chipset, and all other chipsets, system-wide are non-master chipsets controlled by the master chipset. In some embodiments of server platforms consisting of multiple, parallel partitions, one or more jumpers is used to specify one of the multiple partitions as the system-wide master that controls master chipsets in other, parallel partitions. In some embodiments, the master chipset is specified by software at boot time.

Similar to embodiments disclosed above, partition 0 400 and partition 1 401 in some embodiments are coupled using one or more industry-standard interfaces. By using standard interfaces, disclosed embodiments provide an advantage that a server platform can be assembled using off-the-shelf components, like memory chips, that use the standard interface.

In some embodiments, partition 0 400 and partition 1 401 are merged, in which case the server platform is considered to have a single partition, and one of the master chipsets, for example master chipset 402, serves as the master chipset for the partition. In some embodiments, such a merger is done dynamically, in which case master chipset 406 is reconfigured to be a non-master chipset, for example by modifying jumper settings on the PCB.

Embodiments of CPUs 402A-M, 404A-P, 406A-N, and 408A-0 are further described below, including with respect to FIGS. 10-15.

Sideband Messaging Channel

As described above, in some embodiments, in addition to being coupled by standard interfaces, the multiple chipsets are connected by the sideband messaging channel that is used by the master chipset to coordinate boot flows and reset flows.

Figure 5A:
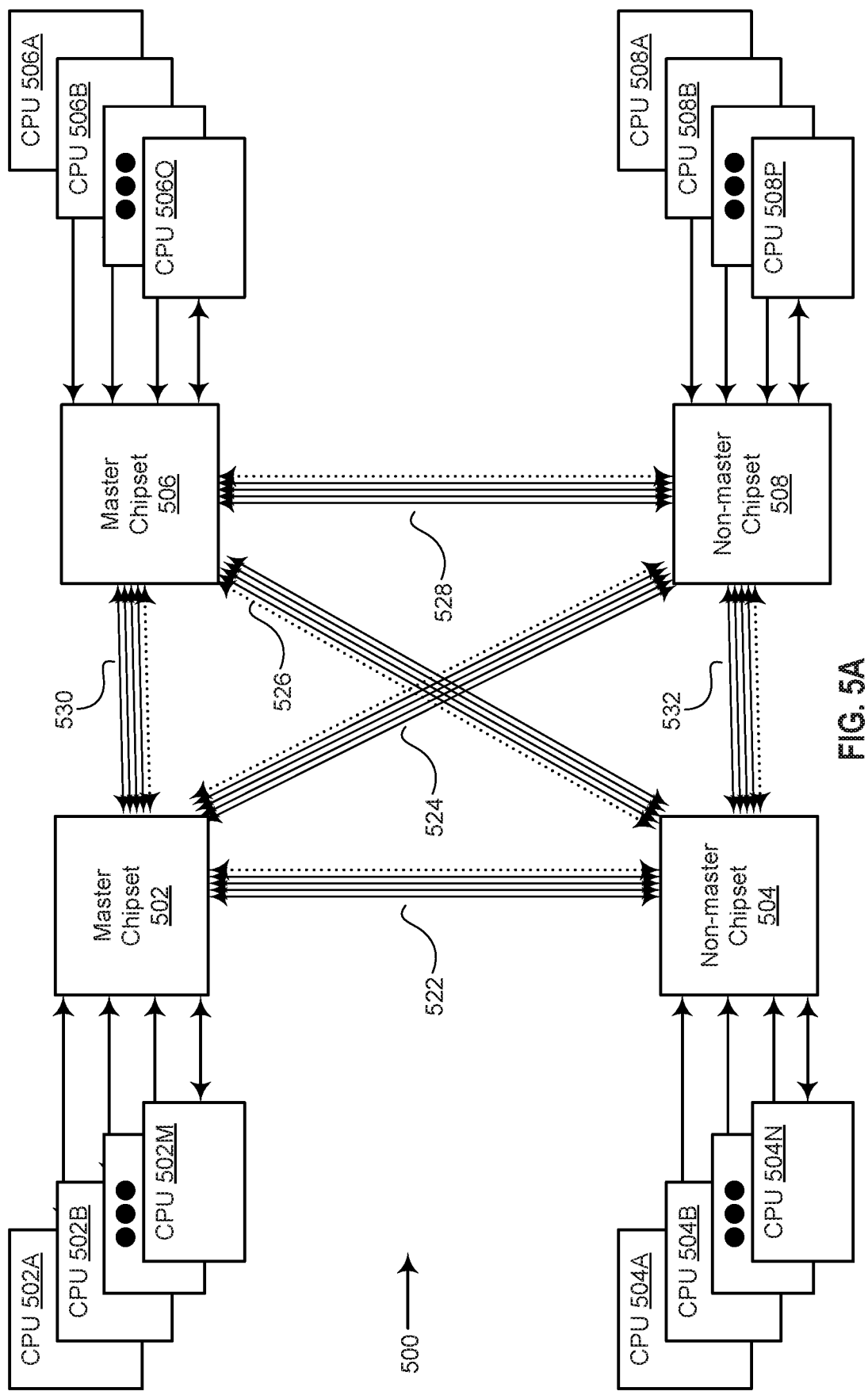
FIGS. 5A-5D are block diagrams illustrating a sideband messaging channel and its multiple-driver sync wire, according to some embodiments.

FIG. 5A is a block diagram illustrating a sideband messaging channel and its multiple-driver sync wire, according to some embodiments. As shown, the server platform 500 embodies a parallel topology that includes master chipset 502 and its associated CPUs 502A-M, non-master chipset 504 and its associated CPUs 504A-N, non-master chipset 506 and its associated CPUs 506A-O, and non-master chipset 508 and its associated CPUs 508A-P. Also shown are sideband messaging channels 522, 524, 526, 528, 530, and 532, connecting each of the chipsets to each other. For example, sideband messaging channels 522, 524, and 530 connect master chipset 502 to non-master chipsets 504, 508, and 506, respectively. In some embodiments, the sideband messaging channel is also available and used by one or more of the CPUs.

As shown, each of the sideband messaging channels includes three serial connections, and one sync wire. The number of serial connections and the number of sync wires can vary, without limitation. The sync wire, described further below, is illustrated as a dotted line. As used herein, the term, "sideband messaging channel," can be used to refer individually to 522, 524, 526, 528, 530, and 532, and can be used to refer to two or more of 522, 524, 526, 528, 530, and 532, collectively. In operation, the master chipset uses the sideband messaging channels to coordinate synchronized reset and boot flows with the non-master chipsets. For example, master chipset 502 coordinates reset and boot flows with non-master chipset 504.

In some embodiments, the sideband messaging channel connects a master chipset having a plurality of interfaces, for example eight interfaces, to other chipsets and CPUs. In some embodiment, each chipset, whether a master or a non-master, supports up to eight such sideband messaging channels.

In some embodiments, the sideband messaging channel includes a multiple-driver sync wire that can be driven by any of the master chipset and the non-master chipsets. Any of the non-master chipsets can drive the sync wire to get the attention of the master chipset, for example to request that the master chipset coordinate a reset or a boot flow. The master chipset, in turn, can drive the sync wire to signal various events, as described further below, during the course of a flow.

Figure 5B:
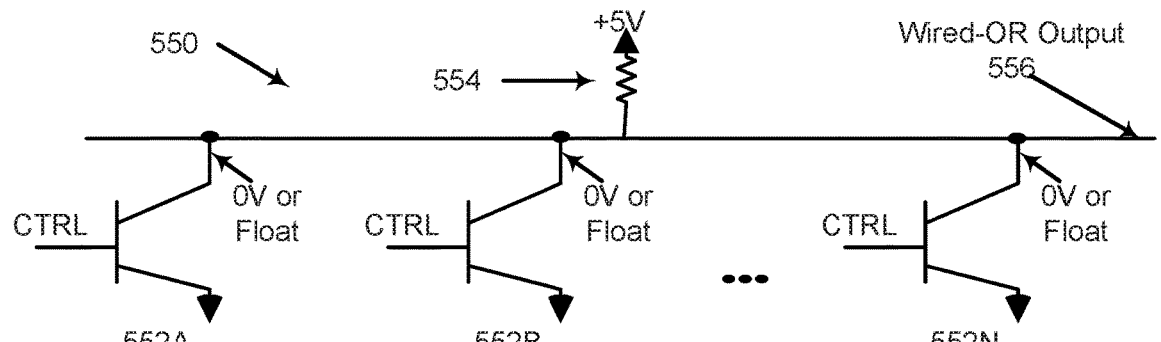
Figure 5C:
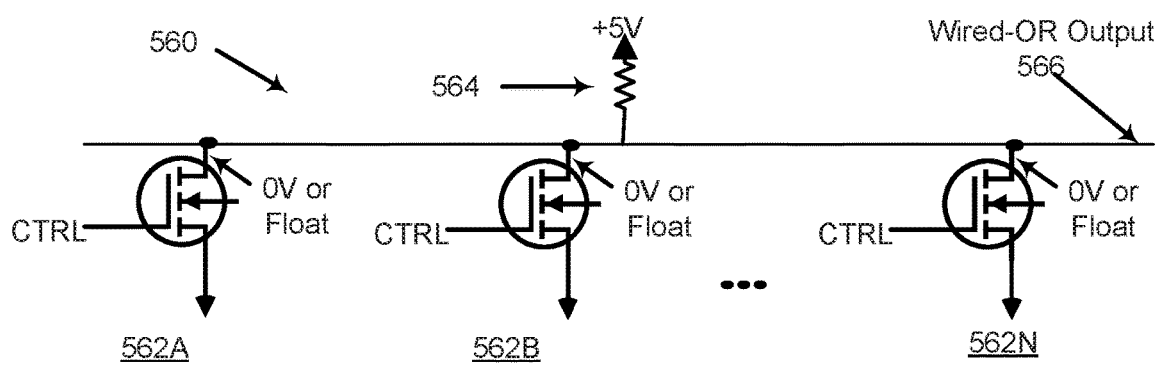
Figure 5D:
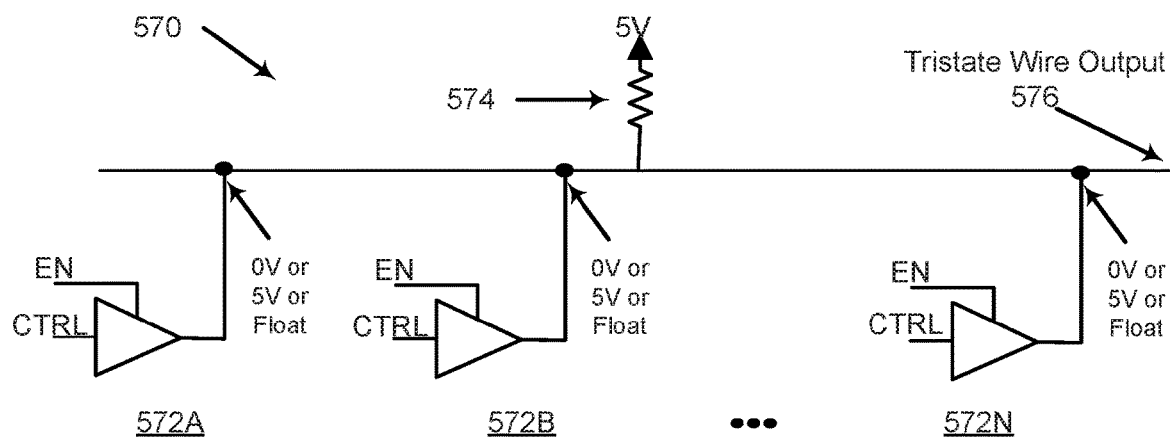

FIGS. 5B-D are block diagrams illustrating multiple-driver sync wires, according to some embodiments. FIG. 5B illustrates a circuit to drive the sync wire, according to an embodiment. Circuit 550 includes open collector output buffers 552A, 552B, through 552N, which each set wired-or output 556, to 0V or floating, depending on its CTRL input. In operation, weak pull-up resistor 554 sets wired-or output 556 to 5V, which is conditionally driven to 0V if any of the CTRL inputs of buffers 552A-N is high. By having each of the partition chipsets and CPUs drive one of buffers 552A-N, wired-or output 556 serves as an active-low multiple-driver sync wire.

Embodiments of CPUs 502A-M, 504A-N, 506A-O, and 508A-P, and system 500 are further described below, including with respect to FIGS. 10-15.

FIG. 5C illustrates a circuit to drive the sync wire, according to another embodiment. Circuit 560 includes open-drain transistors 562A, 562B, through 312N, which each set wired- or output 566, to 0V or floating, depending on its CTRL input. In operation, weak pull-up resistor 564 sets wired-or output 566 to 5V, which is conditionally driven to 0V if any of the CTRL inputs of buffers 562A-N is high. By having each of the partition chipsets and CPUs drive one of buffers 12A-N, wired-or output 566 serves as an active-low multiple-driver sync wire.

FIG. 5D illustrates a circuit to drive the sync wire, according to another embodiment. Circuit 570 includes tristate buffers 572A, 572B, through 572N, which each set tristate wire output 576, to 0V, 5V, or floating, depending on its CTRL and EN inputs. In operation, weak pull-up resistor 574 sets tristate wire output 576 to 5V, which is conditionally driven to 0V if any of the EN inputs of buffers 572A-N is high with a CTRL input equal to 0V. By having each of the partition chipsets and CPUs drive one of buffers 572A-N, tristate wire output 576 serves as an active-low multiple-driver sync wire.

Coordinated Boot Flows

Figure 6:
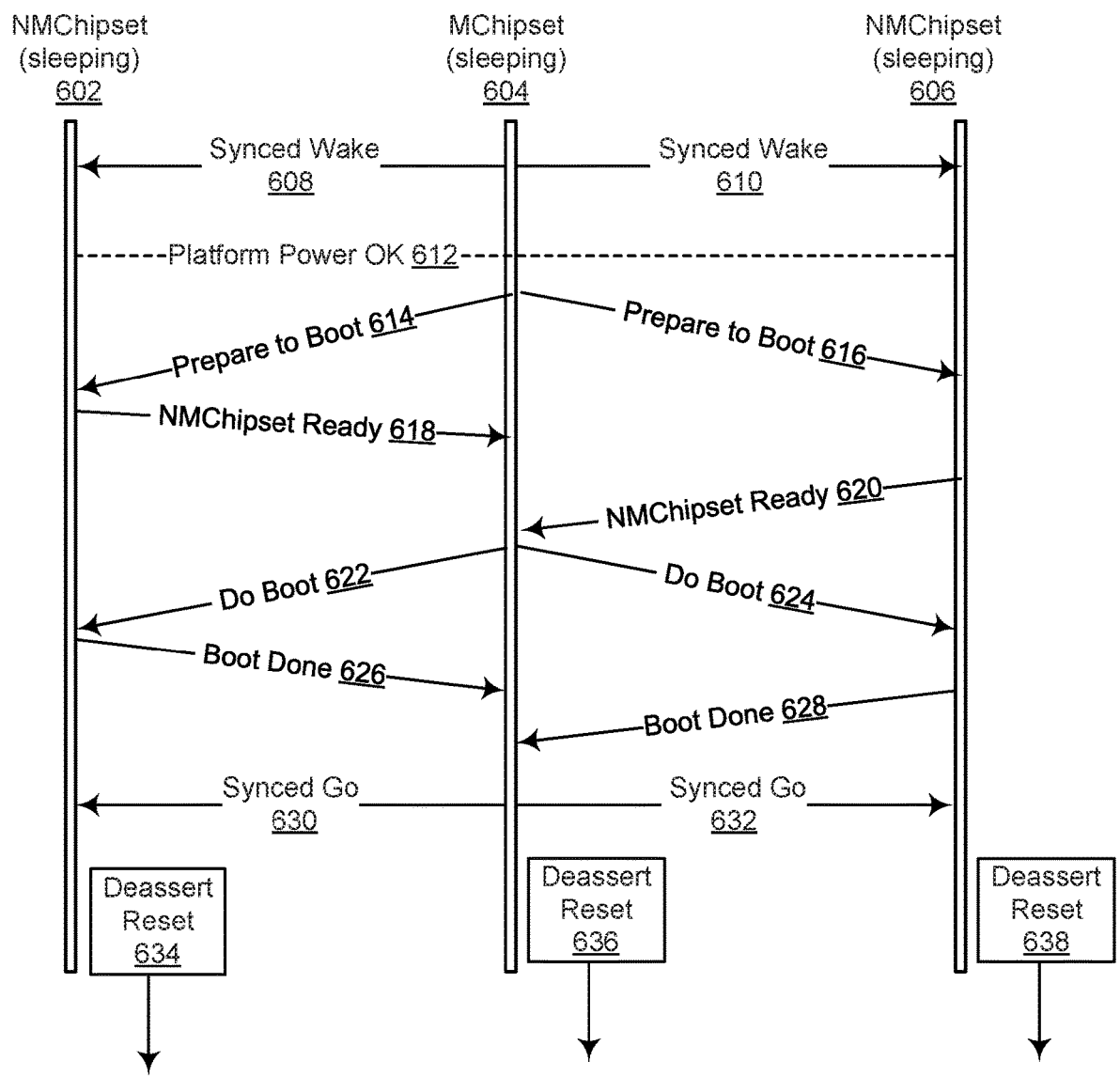
FIG. 6 is a flow diagram illustrating a coordinated system boot of a plurality of chipsets with improved RAS, according to an embodiment.

FIG. 6 is a flow diagram illustrating a master chipset performing a coordinated system boot of a plurality of chipsets with improved RAS, according to an embodiment. As shown, MChipset 604 (master chipset) and NMChipsets 602 and 606 (non-master chipsets) are in a system sleep state at the top of the diagram. Then a wake event is received by MChipset 604, which uses the sideband messaging channel to indicate the wake event to the rest of the chipsets at 608 (to NMChipset 602) and at 610 (to NMChipset 606). At 612 (indicated by a dashed line because it does not refer to a chipset action), the server platform power is OK. After preparing to boot, MChipset 604 uses the sideband messaging channel to prompt the non-master chipsets to prepare to boot at 614 (to NMChipset 602) and at 616 (to NMChipset 606). By so doing, MChipset 604 causes the NMChipsets to prepare to boot by performing an internal reset of their partitions and also discovers their status and readiness to boot.

In some embodiments, NMChipsets 602 and 606 prepare to boot by initializing basic system functions used by the chipset itself any by processors connected to it. For example, in some embodiments the chipset allows some time for its power supply to settle to a normal state. Once the power supply settles, the chipsets in some embodiments generate a number of derived voltage levels needed by their partitions, for example by dividing a main 12-volt power supply down to 1.5-vklt, 3.3-volt, and 5 volt power rails. In some embodiments, clocks are another basic system function initialized by NMChipsets 502 and 505. In some embodiments, for example, a chipset receives an input oscillator clock signal and uses s phase-locked loop to generate different clock frequencies. Generating the clocks can take some time.

In some embodiments, MChipset 604 implements a counter to set a maximum wait time for each of NMChipset 602 and NMChipset 606 to respond, thus allowing MChipset 604 to continue the flow if the response time is too high for some reason. After some time, NMChipsets 602 and 606 use the sideband messaging channel to signal their readiness to boot at 618 and 620.

There can be some variance in the timing of 618 and 620; the different NMChipsets can take different amounts of time to get ready to boot. As shown, NMChipset 606 takes longer than NMChipset 602 to signal its readiness. In some embodiments, MChipset 604 implements a counter to set a maximum wait time for each of NMChipset 602 and NMChipset 606 to respond, thus allowing MChipset 604 to continue the flow if the response time is too high. After discovering that all NMChipsets are ready to boot, MChipset 604 uses the sideband messaging channel to instruct the NMChipsets to do the boot at 622 (to NMChipset 602) and 624 (to NMChipset 606).

In some embodiments, NMChipsets 602 and 606 perform the boot by initializing a variety of subsystems and functionality. In some embodiments, for example, a memory management unit is initialized. In some examples, cache memories are flushed. In some embodiments, interrupt handling hardware is initialized. In some embodiments, telecommunication micro engines, which have their own firmware independent of the operating system firmware, are initialized. The particular steps performed by NMChipsets 602 and 606, and whether those steps are performed after receiving prompts at 614/616, after receiving prompts at 822/624, or not at all, can vary without limitation.

In some embodiments, MChipset 604 implements a counter to set a maximum wait time for each of NMChipset 602 and NMChipset 606 to respond, thus allowing MChipset 604 to continue the flow if the response time is too high. After some time, NMChipsets 602 and 606 use the sideband messaging channel to signal completion of their boot at 626 and 628. There can be some variance in the timing of 626 and 628; the different NMChipsets can take different amounts of time to boot. As shown, NMChipset 606 takes longer than NMChipset 602 to signal completion of its boot. In some embodiments, MChipset 604 uses a counter to set a maximum wait time to receive 626 and 628, and drops the associated non-master chipset upon expiration of the counter.

After receiving the boot done signals from the NMChipsets, MChipset 604 uses the sideband messaging channel to send a synced go at 630 (to NMChipset 602) and at 632 (to NMChipset 606). In some embodiments, MChipset 604 also routes the synced go to itself. At 634, 636, and 638, all the chipsets, MChipset 604 and NMChipsets 602 and 606, deassert a reset signal in their partition. In some embodiments, the chipsets then begin to fetch and execute instructions, and independent operation by all the partitions ensues.

If the system is booting up from a warm reset, which does not require a power cycle, MChipset 604 skips the initial Master discovery, 614, 616, 618, and 620 to save boot time. The remaining flow stays the same.

Figure 7:
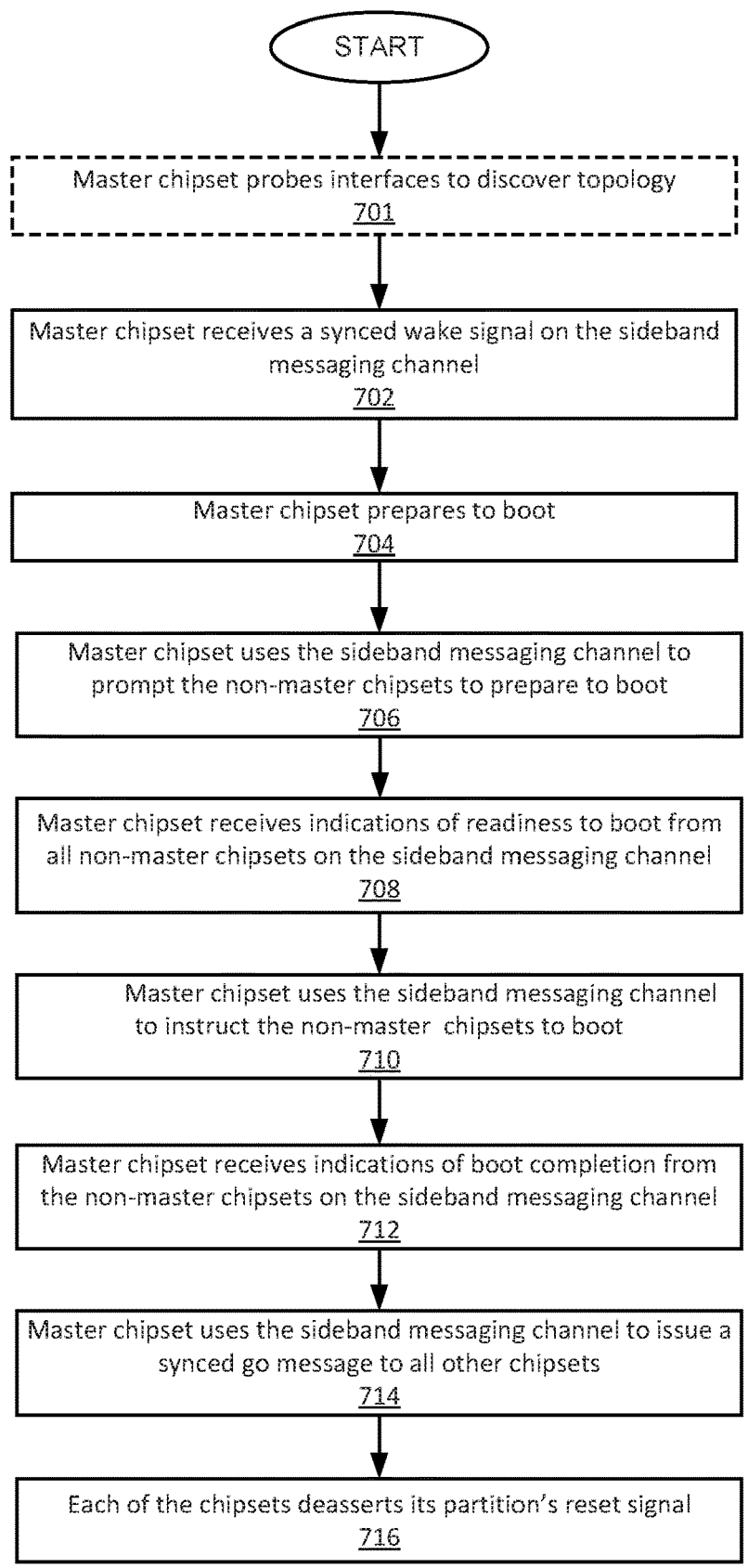
FIG. 7 is a flow diagram illustrating a master chipset performing a coordinated system boot of a plurality of chipsets with improved RAS, according to an embodiment.

FIG. 7 is a flow diagram illustrating a master chipset performing a coordinated system boot of a plurality of chipsets with improved RAS, according to an embodiment. After starting, at 701, the master chipset optionally probes a subset of its interfaces to discover a topology of processors and chipsets connected to it. 701 is optional, as indicated by its dashed border, insofar as the topology may already be known to the master chipset. Before 702, with all partitions are in a sleep state. At 702, the master chipset receives a synced wake signal on the sideband messaging channel. In response, at 704, the master chipset prepares to boot. At 706, the master chipset uses the sideband messaging channel to prompt the non-master chipsets to prepare to boot. At 708, the master chipset receives indications of readiness to boot from all non-master chipsets on the sideband messaging channel. At 710, the master chipset uses the sideband messaging channel to instruct the non-master chipsets to boot. At 712, the master chipset receives indications of boot completion from the non-master chipsets on the sideband messaging channel. At 714, the master chipset uses the sideband messaging channel to issue a synced go message to all other chipsets. At 716, each of the chipsets deasserts its partition's reset signal.

Coordinated Reset Flows

Figure 8A:
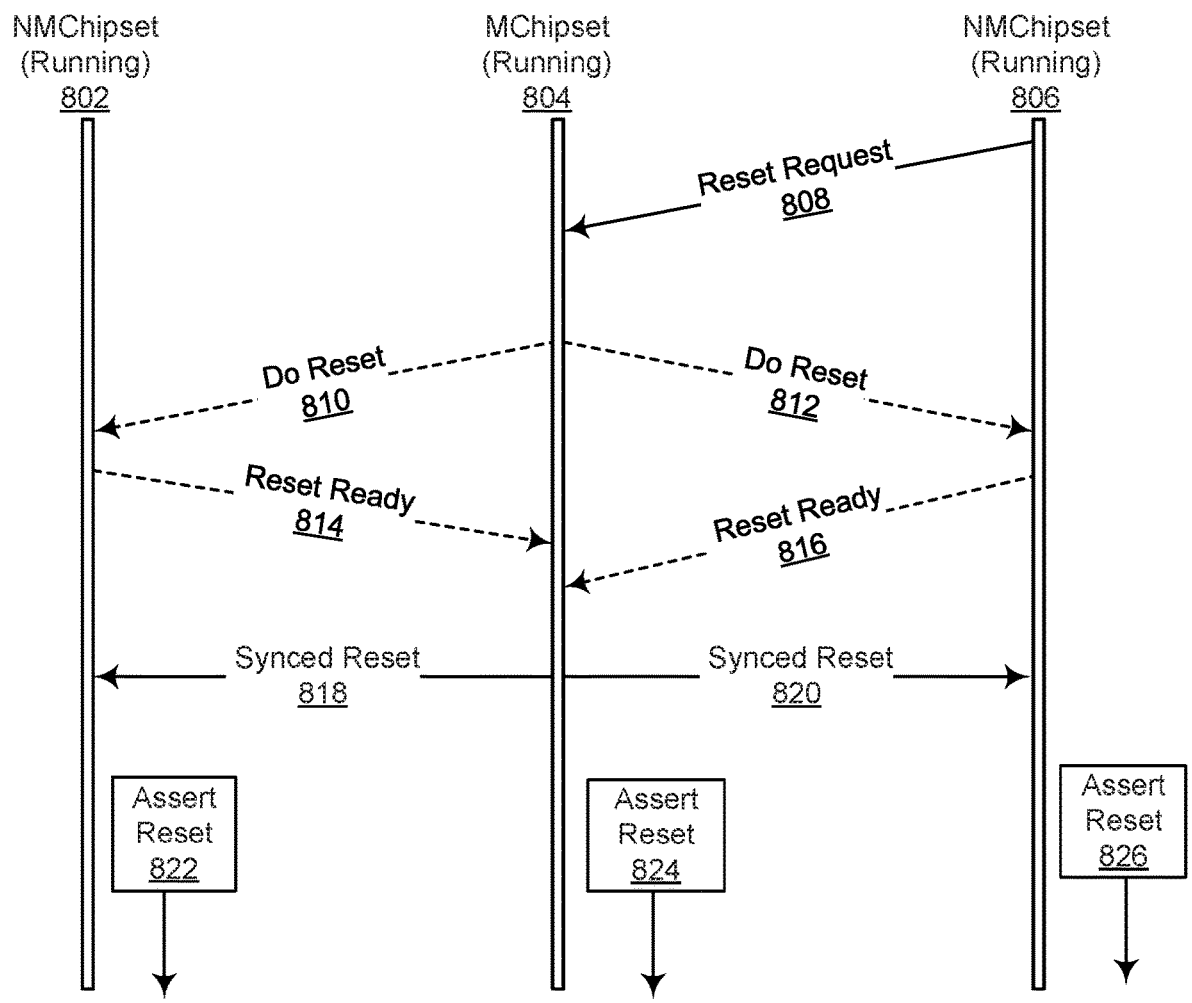
FIG. 8A is a flow diagram illustrating a coordinated system boot of a plurality of chipsets with improved RAS, according to an embodiment.

FIG. 8A is a flow diagram illustrating a master chipset performing a coordinated system reset of a partition with improved RAS, according to an embodiment. As shown, MChipset 804 (master chipset), NMChipset 802 (non-master chipset), and NMChipset 806 (non-master chipset) are in a running state at the top of the diagram. Then at 808 NMChipset 806 uses the sideband messaging channel to transmit a reset request and the reset type (i.e., host partition reset without power cycle, host partition reset with power cycle, host partition reset with power down, Sx entry) to MChipset 804. In some embodiments, NMChipset 806 generates the reset request in response to a reset scenario. MChipset 804 enters reset preparation and uses the sideband messaging channel to send a reset request at 810 (to NMChipset 802) and at 812 (to NMChipset 806), along with the specific reset type. By so doing, MChipset 804 prompts the NMChipsets to prepare to reset their partitions and also discovers their status. In some embodiments, MChipset 804 implements a counter to set a maximum wait time for each of NMChipset 802 and NMChipset 806 to respond, thus allowing MChipset 604 to continue the flow if the response time is too high. When all NMChipsets have completed reset preparation, they use the sideband messaging channel to indicate their readiness to reset at 814 (from NMChipset 802) and at 816 (from NMChipset 806). There can be some variance in the timing of 814 and 816; the different NMChipsets can take different amounts of time to prepare to reset. As shown, NMChipset 806 takes longer than NMChipset 802 to signal readiness to reset. In some embodiments, MChipset 804 implements a counter to set a maximum wait time for each of NMChipset 802 and NMChipset 806 to respond, and drops the associated NMChipset from the flow if the response time is too high. Upon receiving a readiness indication from all NMChipsets, MChipset 804 uses the sideband messaging channel to assert a synced reset at 818 (to NMChipset 802) and 820 (to NMChipset 806). In some embodiments, MChipset 804 also routes the synced reset to itself. At 822, 824, and 826, all the chipsets, NMChipset 802, MChipset 804, and NMChipset 806 assert their partition's reset signal.

The coordinated reset illustrated in FIG. 8A is an example of a graceful reset. In some embodiments, an ungraceful reset is supported, for example when a chipset or CPU encounters a sudden reset scenario. In this case, timing may be-critical and not allow time for a handshake. As such, sideband messages 810, 812, 814, and 816, which represent an initial handshake, are shown with dashed lines, indicating that they are optional. In the case of an ungraceful reset, the requesting chipset tries to warn the other chipsets of an imminent reset at 808. In some embodiments, a requesting chipset at 808 only sends the reset request to its master chipset. In other embodiments, the requesting chipset at 808 sends the reset warning to all the chipsets in the partition, including other, non-master chipsets. Such a warning may improve the predictability and timing, even of an ungraceful reset. Upon receipt of the warning, each of the other chipsets quickly prepares to reset, for example by attempting to salvage data stored in memory and registers before the imminent reset. A global reset can typically cause two reactions after a reset cycle: return to S0 automatically or wait for wake. In some embodiments, to ensure synchronicity and reduce platform burden, all chipsets will wait for wake. System synchronization can be restored during wake.

Figure 8B:
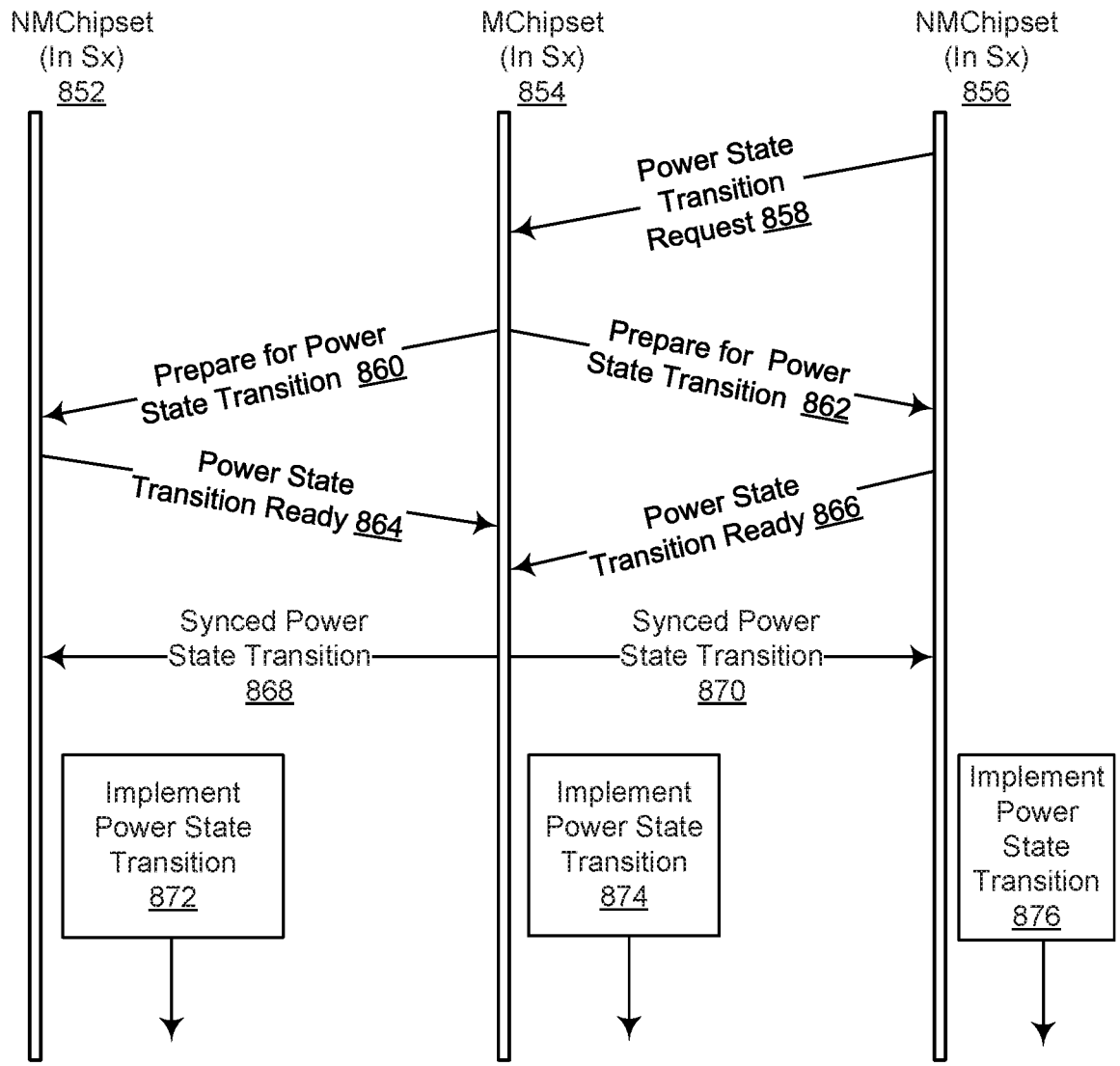
FIG. 8B is a flow diagram illustrating a coordinated power state transition among a plurality of chipsets with improved RAS, according to an embodiment.

FIG. 8B is a flow diagram illustrating a master chipset performing a coordinated power state transition of a partition with improved RAS, according to an embodiment. As shown, MChipset 854 (master chipset), NMChipset 852 (non-master chipset), and NMChipset 856 (non-master chipset) are in some S-state, "Sx," at the top of the diagram. Then at 858 NMChipset 856 uses the sideband messaging channel to transmit a power state transition request and the power state transition type (i.e., New s-state to enter) to MChipset 854. MChipset 854 enters power state transition preparation and uses the sideband messaging channel to send a prepare for power state transition request at 860 (to NMChipset 852) and at 862 (to NMChipset 856), along with the power state transition type. By so doing, MChipset 854 prompts the NMChipsets to prepare to perform for a power state transition of their partitions and also discovers their status. In some embodiments, MChipset 854 implements a counter to set a maximum wait time for each of NMChipset 852 and NMChipset 856 to respond, thus allowing MChipset 604 to continue the flow if the response time is too high. When all NMChipsets have completed power state transition preparation, they use the sideband messaging channel to indicate their readiness for power state transition at 864 (from NMChipset 852) and at 866 (from NMChipset 856). There can be some variance in the timing of 864 and 866; the different NMChipsets can take different amounts of time to prepare for power state transition. As shown, NMChipset 856 takes longer than NMChipset 852 to signal readiness for power state transition. Upon receiving a readiness indication from all NMChipsets, MChipset 854 uses the sideband messaging channel to assert a synced power state transition at 868 (to NMChipset 852) and 870 (to NMChipset 856). In some embodiments, MChipset 854 also routes the synced power state transition to itself. At 872, 874, and 876, all the chipsets, NMChipset 852, MChipset 854, and NMChipset 856 implement the power state transition.

Figure 9:
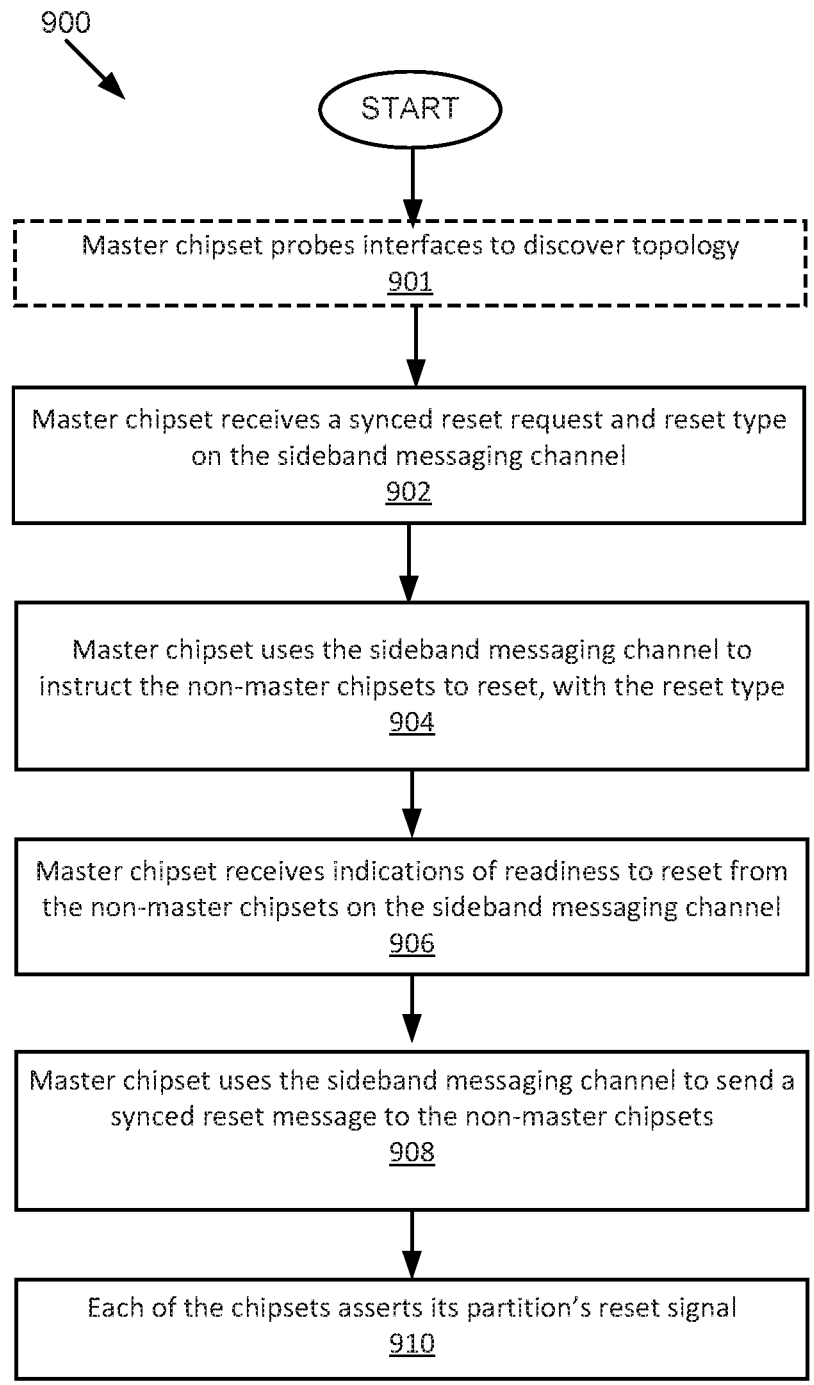
FIG. 9 is a flow diagram illustrating a master chipset performing a coordinated system reset of a plurality of chipsets with improved RAS, according to an embodiment.

FIG. 9 is a flow diagram illustrating a master chipset performing a coordinated system reset of a plurality of chipsets with improved RAS, according to an embodiment. After starting, at 901 the master chipset optionally probes a subset of its interfaces to discover a topology of processors and chipsets connected to it. 901 is optional, as indicated by its dashed border, insofar as the topology may already be known to the master chipset. Before 902, all partitions in a running state.

At 902 the master chipset receives a synced reset request and reset type on the sideband messaging channel. Such a reset request is presumably generated by one of the non-master chipsets coupled to the master chipset. The reset type can be any one of host partition reset without power cycle, host partition reset with power cycle, and host partition reset with power down.

In some embodiments, the reset type includes a hint as to whether the reset should be graceful or ungraceful. The requesting chipset may indicate that the reset should be ungraceful if it has reason to suspect that reset is imminent and will not allow time for a handshake. For example, a power button on the partition may be engaged, leading to an imminent reset in a matter of tens or hundreds of milliseconds. In some embodiments, the master chipset determines on its own to treat the synchronized reset as an ungraceful reset, for example when its internal request queues contain more than a threshold number of requests or when part of a flow takes more than a threshold number of cycles.

In some embodiments, flow 900 is used to coordinate partition-wide synchronized transitions in power S-state, as defined in the Advanced Configuration and Power Interface (ACPI) standard. For example, the power state can transition from S0 (running) to S5 (soft off), or from S3 (standby) to S4 (hibernate), or from S1 (power on suspend) to S2 (CPU powered off), or other transitions, without limitation. The ACPI standard defines six "Sx" states, but some embodiments define more states. To affect a transition in power state, the reset type received at 902 reflects the change to a new Sx state.

In response, at 904, the master chipset uses the sideband messaging channel to instruct the non-master chipsets to reset, with the reset type. At 906, the master chipset receives indications of readiness to reset from the non-master chipsets on the sideband messaging channel. At 908, the master chipset uses the sideband messaging channel to send a synced reset message to the non-master chipsets. At 910, each of the chipsets deasserts its partition's reset signal.

Exemplary Processors

Figure 10:
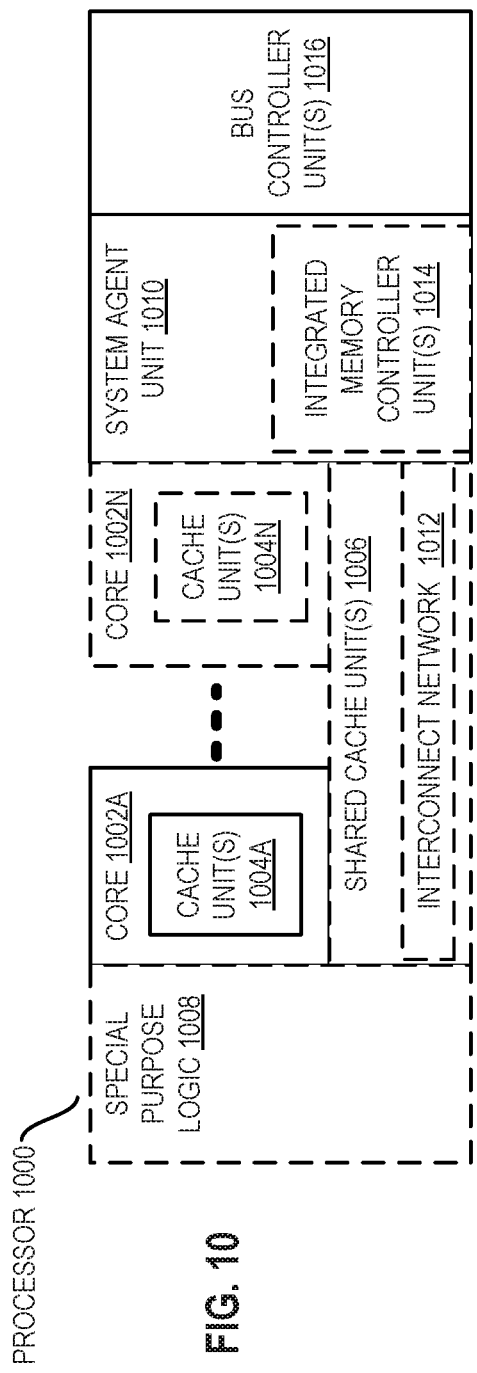
FIG. 10 is a block diagram of a processor that may have more than one core, may have an integrated memory controller, and may have integrated graphics according to embodiments of the invention.

FIG. 10 is a block diagram of a processor 1000 that may have more than one core, may have an integrated memory controller, and may have integrated graphics according to embodiments of the invention. The solid lined boxes in FIG. 10 illustrate a processor 1000 with a single core 1002A, a system agent 1010, a set of one or more bus controller units 1016, while the optional addition of the dashed lined boxes illustrates an alternative processor 1000 with multiple cores 1002A-N, a set of one or more integrated memory controller unit(s) 1014 in the system agent unit 1010, and special purpose logic 1008.

Thus, different implementations of the processor 1000 may include: 1) a CPU with the special purpose logic 1008 being integrated graphics and/or scientific (throughput) logic (which may include one or more cores), and the cores 1002A-N being one or more general purpose cores (e.g., general purpose in-order cores, general purpose out-of-order cores, a combination of the two); 2) a coprocessor with the cores 1002A-N being a large number of special purpose cores intended primarily for graphics and/or scientific (throughput); and 3) a coprocessor with the cores 1002A-N being a large number of general purpose in-order cores. Thus, the processor 1000 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 1000 may be a part of and/or may be implemented on one or more substrates using any of a number of process technologies, such as, for example, BiCMOS, CMOS, or NMOS.

The memory hierarchy includes one or more levels of cache within the cores, a set or one or more shared cache units 1006, and external memory (not shown) coupled to the set of integrated memory controller units 1014. The set of shared cache units 1006 may include one or more mid-level caches, such as level 2 (L2), level 3 (L3), level 4 (L4), or other levels of cache, a last level cache (LLC), and/or combinations thereof. While in one embodiment a ring based interconnect unit 1012 interconnects the integrated graphics logic 1008 (integrated graphics logic 1008 is an example of and is also referred to herein as special purpose logic), the set of shared cache units 1006, and the system agent unit 1010/integrated memory controller unit(s) 1014, alternative embodiments may use any number of well-known techniques for interconnecting such units. In one embodiment, coherency is maintained between one or more cache units 1006 and cores 1002-A-N.

In some embodiments, one or more of the cores 1002A-N are capable of multi-threading. The system agent 1010 includes those components coordinating and operating cores 1002A-N. The system agent unit 1010 may include for example a power control unit (PCU) and a display unit. The PCU may be or include logic and components needed for regulating the power state of the cores 1002A-N and the integrated graphics logic 1008. The display unit is for driving one or more externally connected displays.

The cores 1002A-N may be homogenous or heterogeneous in terms of architecture instruction set; that is, two or more of the cores 1002A-N may be capable of execution the same instruction set, while others may be capable of executing only a subset of that instruction set or a different instruction set.

Exemplary Computer Architectures

FIGS. 11-14 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 11:
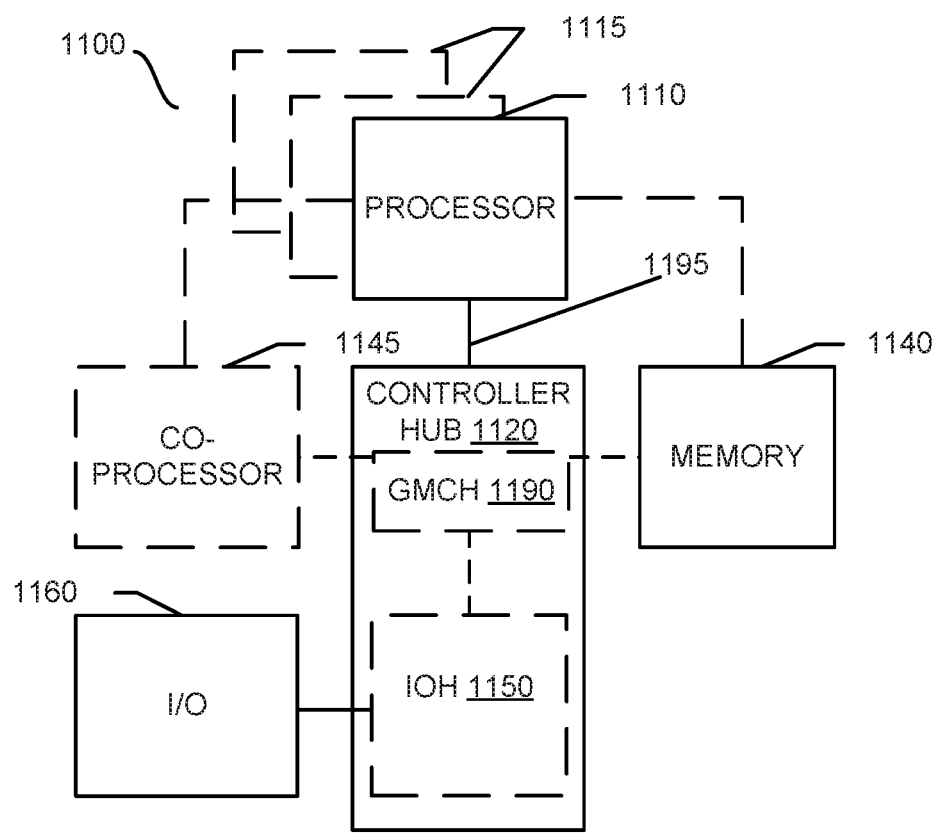
FIGS. 11-14 are block diagrams of exemplary computer architectures.

Referring now to FIG. 11, shown is a block diagram of a system 1100 in accordance with one embodiment of the present invention. The system 1100 may include one or more processors 1110, 1115, which are coupled to a controller hub 1120. In one embodiment, the controller hub 1120 includes a graphics memory controller hub (GMCH) 1190 and an Input/Output Hub (IOH) 1150 (which may be on separate chips); the GMCH 1190 includes memory and graphics controllers to which are coupled memory 1140 and a coprocessor 1145; the 10H 1150 couples input/output (I/O) devices 1160 to the GMCH 1190. Alternatively, one or both of the memory and graphics controllers are integrated within the processor (as described herein), the memory 1140 and the coprocessor 1145 are coupled directly to the processor 1110, and the controller hub 1120 in a single chip with the IOH 1150.

The optional nature of additional processors 1115 is denoted in FIG. 11 with broken lines. Each processor 1110, 1115 may include one or more of the processing cores described herein and may be some version of the processor 1000.

The memory 1140 may be, for example, dynamic random access memory (DRAM), phase change memory (PCM), or a combination of the two. For at least one embodiment, the controller hub 1120 communicates with the processor(s) 1110, 1115 via a multi-drop bus, such as a frontside bus (FSB), point-to-point interface such as QuickPath Interconnect (QPI), or similar connection 1195.

In one embodiment, the coprocessor 1145 is a special-purpose processor, such as, for example, a high-throughput MIC processor, a network or communication processor, compression engine, graphics processor, GPGPU, embedded processor, or the like. In one embodiment, controller hub 1120 may include an integrated graphics accelerator.

There can be a variety of differences between the physical resources 1110, 1115 in terms of a spectrum of metrics of merit including architectural, microarchitectural, thermal, power consumption characteristics, and the like.

In one embodiment, the processor 1110 executes instructions that control data processing operations of a general type. Embedded within the instructions may be coprocessor instructions. The processor 1110 recognizes these coprocessor instructions as being of a type that should be executed by the attached coprocessor 1145. Accordingly, the processor 1110 issues these coprocessor instructions (or control signals representing coprocessor instructions) on a coprocessor bus or other interconnect, to coprocessor 1145. Coprocessor(s) 1145 accept and execute the received coprocessor instructions.

Figure 12:
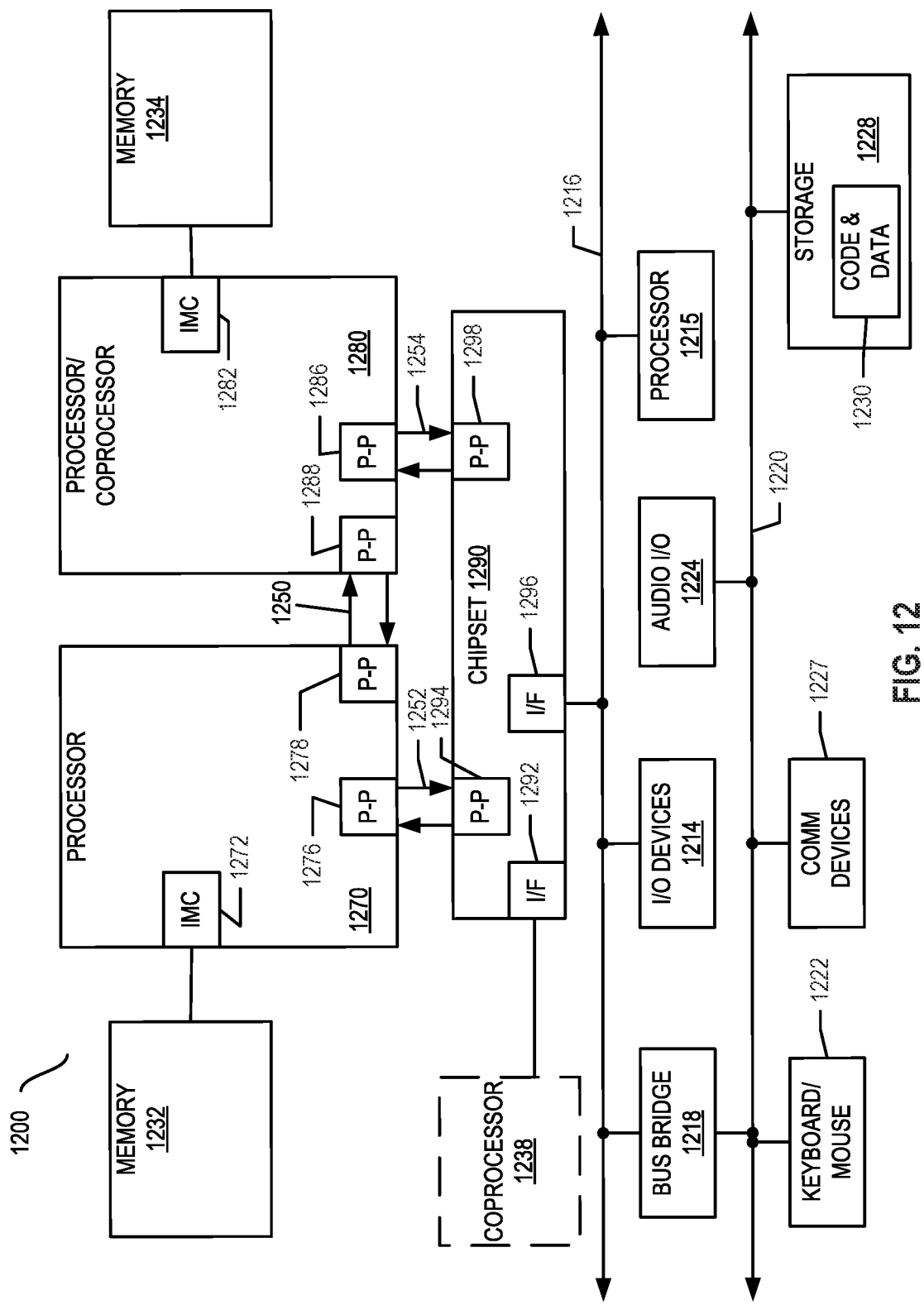

Referring now to FIG. 12, shown is a block diagram of a first more specific exemplary system 1200 in accordance with an embodiment of the present invention. As shown in FIG. 12, multiprocessor system 1200 is a point-to-point interconnect system, and includes a first processor 1270 and a second processor 1280 coupled via a point-to-point interconnect 1250. Each of processors 1270 and 1280 may be some version of the processor 1000. In one embodiment of the invention, processors 1270 and 1280 are respectively processors 1110 and 1115, while coprocessor 1238 is coprocessor 1145. In another embodiment, processors 1270 and 1280 are respectively processor 1110 coprocessor 1145.

Processors 1270 and 1280 are shown including integrated memory controller (IMC) units 1272 and 1282, respectively. Processor 1270 also includes as part of its bus-controller units' point-to-point (P-P) interfaces 1276 and 1278; similarly, second processor 1280 includes P-P interfaces 1286 and 1288. Processors 1270, 1280 may exchange information via a point-to-point (P-P) interface 1250 using P-P interface circuits 1278, 1288. As shown in FIG. 12, IMCs 1272 and 1282 couple the processors to respective memories, namely a memory 1232 and a memory 1234, which may be portions of main memory locally attached to the respective processors.

Processors 1270, 1280 may each exchange information with a chipset 1290 via individual P-P interfaces 1252, 1254 using point to point interface circuits 1276, 1294, 1286, 1298. Chipset 1290 may optionally exchange information with the coprocessor 1238 via a high-performance interface 1292. In one embodiment, the coprocessor 1238 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 1290 may be coupled to a first bus 1216 via an interface 1296. In one embodiment, first bus 1216 may be a Peripheral Component Interconnect (PCI) bus, or a bus such as a PCI Express bus or another third generation I/O interconnect bus, although the scope of the present invention is not so limited.

As shown in FIG. 12, various I/O devices 1214 may be coupled to first bus 1216, along with a bus bridge 1218 which couples first bus 1216 to a second bus 1220. In one embodiment, one or more additional processor(s) 1215, such as coprocessors, high-throughput MIC processors, GPGPU's, accelerators (such as, e.g., graphics accelerators or digital signal processing (DSP) units), field programmable gate arrays, or any other processor, are coupled to first bus 1216. In one embodiment, second bus 1220 may be a low pin count (LPC) bus. Various devices may be coupled to a second bus 1220 including, for example, a keyboard and/or mouse 1222, communication devices 1227 and a storage unit 1228 such as a disk drive or other mass storage device which may include instructions/code and data 1230, in one embodiment. Further, an audio I/O 1224 may be coupled to the second bus 1220. Note that other architectures are possible. For example, instead of the point-to-point architecture of FIG. 12, a system may implement a multi-drop bus or other such architecture.

Figure 13:
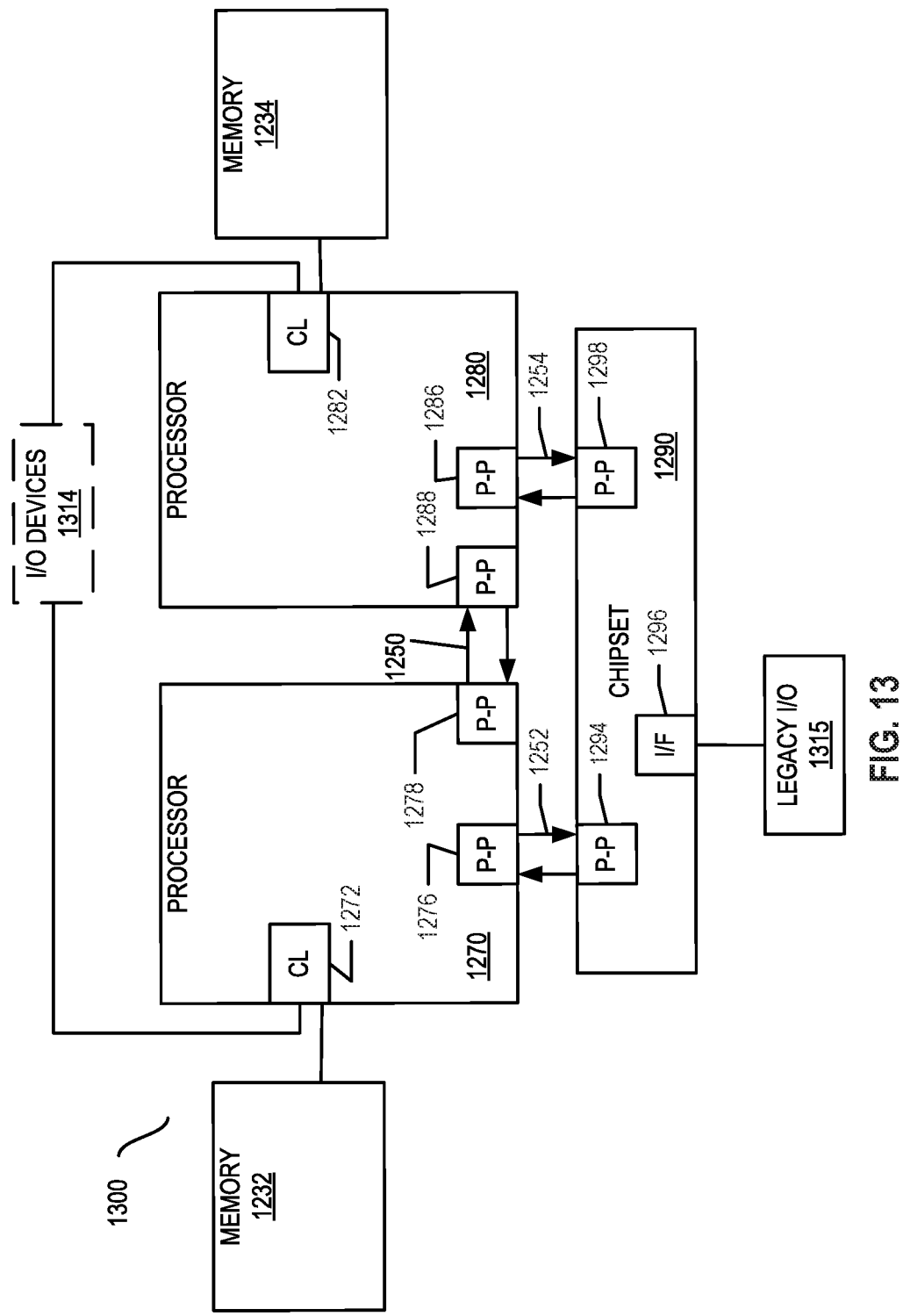

Referring now to FIG. 13, shown is a block diagram of a second more specific exemplary system 1300 in accordance with an embodiment of the present invention. Like elements in FIGS. 12 and 13 bear like reference numerals, and certain aspects of FIG. 12 have been omitted from FIG. 13 in order to avoid obscuring other aspects of FIG. 13.

FIG. 13 illustrates that the processors 1270, 1280 may include integrated memory and I/O control logic ("CL") 1272 and 1282, respectively. Thus, the CL 1272, 1282 include integrated memory controller units and include I/O control logic. FIG. 13 illustrates that not only are the memories 1232, 1234 coupled to the CL 1272, 1282, but also that I/O devices 1314 are also coupled to the control logic 1272, 1282. Legacy I/O devices 1315 are coupled to the chipset 1290.

Figure 14:
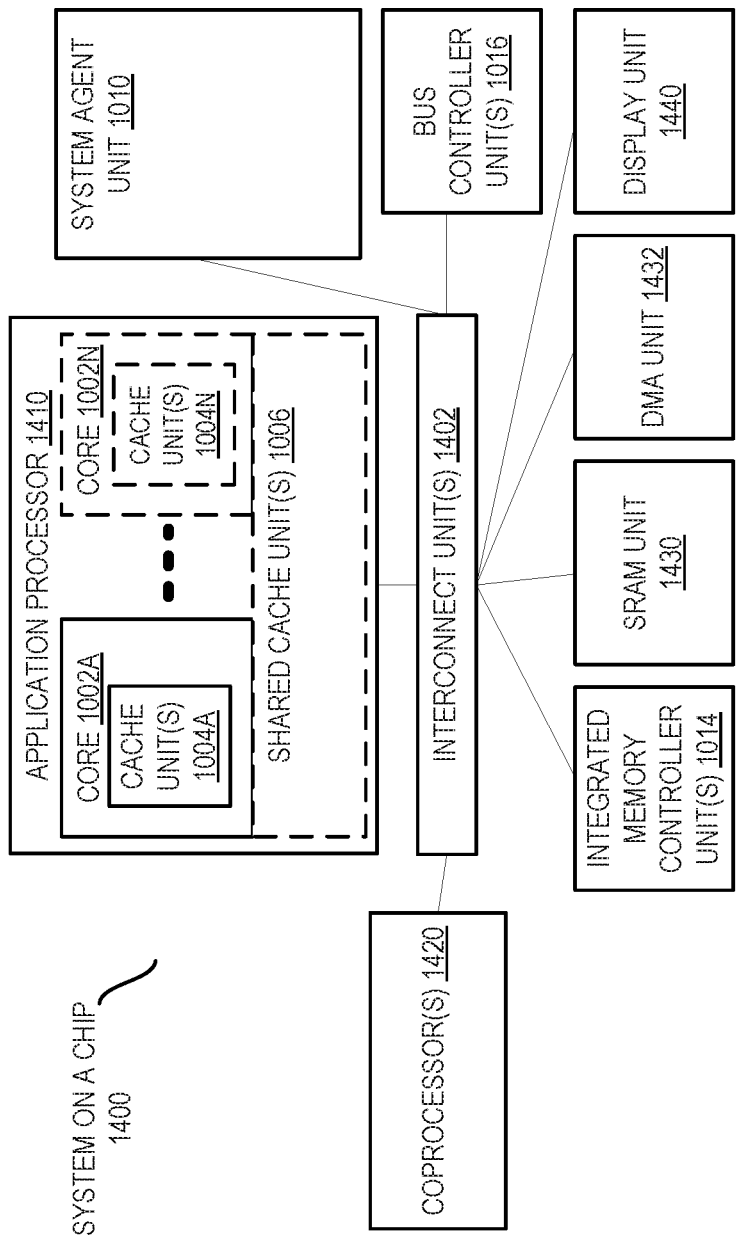

Referring now to FIG. 14, shown is a block diagram of a SoC 1400 in accordance with an embodiment of the present invention. Similar elements in FIG. 10 bear like reference numerals. Also, dashed lined boxes are optional features on more advanced SoCs. In FIG. 14, an interconnect unit(s) 1402 is coupled to: an application processor 1410 which includes a set of one or more cores 1002A-N, which include cache units 1004A-N, and shared cache unit(s) 1006; a system agent unit 1010; a bus controller unit(s) 1016; an integrated memory controller unit(s) 1014; a set or one or more coprocessors 1420 which may include integrated graphics logic, an image processor, an audio processor, and a video processor; an static random access memory (SRAM) unit 1430; a direct memory access (DMA) unit 1432; and a display unit 1440 for coupling to one or more external displays. In one embodiment, the coprocessor(s) 1420 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code, such as code 1230 illustrated in FIG. 12, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMS) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

Emulation (Including Binary Translation, Code Morphing, etc.)

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

FIG. 15 is a block diagram contrasting the use of a software instruction converter to convert binary instructions in a source instruction set to binary instructions in a target instruction set according to embodiments of the invention. In the illustrated embodiment, the instruction converter is a software instruction converter, although alternatively the instruction converter may be implemented in software, firmware, hardware, or various combinations thereof. FIG. 15 shows a program in a high level language 1502 may be compiled using an x86 compiler 1504 to generate x86 binary code 1506 that may be natively executed by a processor with at least one x86 instruction set core 1516. The processor with at least one x86 instruction set core 1516 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 1504 represents a compiler that is operable to generate x86 binary code 1506 (e.g., object code) that can, with or without additional linkage processing, be executed on the processor with at least one x86 instruction set core 1516. Similarly, FIG. 15 shows the program in the high level language 1502 may be compiled using an alternative instruction set compiler 1508 to generate alternative instruction set binary code 1510 that may be natively executed by a processor without at least one x86 instruction set core 1514 (e.g., a processor with cores that execute the MIPS instruction set of MIPS Technologies of Sunnyvale, Calif. and/or that execute the ARM instruction set of ARM Holdings of Sunnyvale, Calif.). The instruction converter 1512 is used to convert the x86 binary code 1506 into code that may be natively executed by the processor without an x86 instruction set core 1514. This converted code is not likely to be the same as the alternative instruction set binary code 1510 because an instruction converter capable of this is difficult to make; however, the converted code will accomplish the general operation and be made up of instructions from the alternative instruction set. Thus, the instruction converter 1512 represents software, firmware, hardware, or a combination thereof that, through emulation, simulation or any other process, allows a processor or other electronic device that does not have an x86 instruction set processor or core to execute the x86 binary code 1506.

FURTHER EXAMPLES

Example 1 provides a system including: a master chipset having multiple interfaces, each interface to connect to one of a processor and a chipset, at least one processor connected to the master chipset, at least one non-master chipset connected to the master chipset, and a sideband messaging channel connecting the master chipset and the non-master chipsets, wherein the sideband messaging channel includes a multiple-driver sync wire, wherein the master chipset is to probe a subset of its multiple interfaces to discover a topology of connected processors and non-master chipsets, and use the sideband messaging channel to coordinate a synchronized boot flow.

Example 2 includes the substance of the exemplary system of Example 1, wherein the master chipset is to coordinate the synchronized boot flow by receiving a synced wake signal on the sideband messaging channel, preparing to boot, using the sideband messaging channel to prompt the non-master chipsets to prepare to boot, receiving indications of readiness to boot from the non-master chipsets on the sideband messaging channel, using the sideband messaging channel to instruct the non-master chipsets to boot, receiving indications of boot completion from the non-master chipsets on the sideband messaging channel, and using the sideband messaging channel to issue a synced go message to the non-master chipsets, wherein each of the non-master chipsets deasserts a partition reset signal.

Example 3 includes the substance of the exemplary system of Example 1, wherein the master chipset is further to use the sideband messaging channel to coordinate a synchronized reset flow, the synchronized reset flow including a graceful reset when a reset scenario allows time for a handshake among the chipsets, and an ungraceful reset otherwise.

Example 4 includes the substance of the exemplary system of Example 3, wherein, in the graceful reset scenario, the master chipset is to coordinate the synchronized reset flow among all chipsets and processors by receiving a synced reset request and a reset type on the sideband messaging channel, using the sideband messaging channel to instruct the non-master chipsets to reset, with the reset type, receiving indications of readiness to reset from the non-master chipsets on the sideband messaging channel, and using the sideband messaging channel to send a synced reset message to the non-master chipsets, wherein each of the non-master chipsets asserts a partition reset signal.

Example 5 includes the substance of the exemplary system of Example 4, wherein, in the ungraceful reset scenario, the master chipset is to immediately send the synced reset request to all chipsets on the sideband messaging channel in order to serve as a warning of an imminent reset.

Example 6 includes the substance of the exemplary system of any one of Examples 1-3, wherein the master chipset is further to use the sideband messaging channel to coordinate a synchronized power state transition flow by receiving a power state transition request and a target power state on the sideband messaging channel, using the sideband messaging channel to instruct the non-master chipsets to do the power state transition, with the target power state, receiving indications on the sideband messaging channel from the non-master chipsets of readiness to transition power state, and using the sideband messaging channel to send a synced power state transition message to the non-master chipsets, wherein each of the non-master chipsets implements the target power state.

Example 7 includes the substance of the exemplary system of any one of Examples 1-3, wherein the master chipset and its connected processors and non-master chipsets include a first partition, wherein the system further includes at least one additional partition including an additional non-master chipset coupled to at least one additional processor, wherein the additional non-master chipset is coupled to the master chipset further coordinates the boot flow, the reset flow, and the power state transition flow by the additional non-master chipset.

Example 8 includes the substance of the exemplary system of any one of Examples 1-3, wherein the multiple-driver sync wire includes a wire coupled to a weak pull-up resistor and which is conditionally discharged by one of multiple open-drain transistors, multiple open-collector transistors, and multiple tristate buffers.

Example 9 includes the substance of the exemplary system of any one of Examples 1-3, wherein, the master chipset, when coordinating the synchronized boot flow to boot from a warm reset state, is already aware of the topology and is to skip probing the subset of its interfaces to discover the topology.

Example 10 includes the substance of the exemplary system of any one of Examples 1-3, further including a printed circuit board with a fixed number of processor sockets, wherein the at least one processor is inserted into one of the fixed number of processor sockets, and wherein additional processors can be inserted into other ones of the fixed number of processor sockets.

Example 11 provides a method including: connecting at least one processor and at least one non-master chipset to a master chipset having multiple interfaces, each interface to connect to one of a processor and a chipset, to, connecting the master chipset and the non-master chipsets using a sideband messaging channel, wherein the sideband messaging channel includes a multiple-driver sync wire, probing, by the master chipset, a subset of its multiple interfaces to discover a topology of connected processors and non-master chipsets, and using the sideband messaging channel, by the master chipset, to coordinate a synchronized boot flow.

Example 12 includes the substance of the exemplary method of Example 11, wherein using the sideband messaging channel to coordinate the synchronized boot flow includes: receiving a synced wake signal on the sideband messaging channel, preparing to boot, using the sideband messaging channel to prompt the non-master chipsets to prepare to boot, receiving indications of readiness to boot from the non-master chipsets on the sideband messaging channel, using the sideband messaging channel to instruct the non-master chipsets to boot, receiving indications of boot completion from the non-master chipsets on the sideband messaging channel, and using the sideband messaging channel to issue a synced go message to the non-master chipsets, wherein each of the non-master chipsets deasserts a partition reset signal.

Example 13 includes the substance of the exemplary method of Example 11, further including using, by the master chipset, the sideband messaging channel to coordinate a synchronized reset flow, the synchronized reset flow including a graceful reset when a reset scenario allows time for a handshake among the chipsets, and an ungraceful reset otherwise.

Example 14 includes the substance of the exemplary method of any one of Examples 11-13, wherein the multiple-driver sync wire includes a wire coupled to a weak pull-up resistor, the method further including conditionally discharging the wire by a discharge circuit selected from the group consisting of one of multiple open-drain transistors, one of multiple open-collector transistors, and one of multiple tristate buffers.

Example 15 includes the substance of the exemplary method of Example 13, wherein coordinating the graceful synchronized reset flow among all chipsets and processors includes: receiving a synced reset request and a reset type on the sideband messaging channel, using the sideband messaging channel to instruct the non-master chipsets to reset, with the reset type, receiving indications of readiness to reset from the non-master chipsets on the sideband messaging channel, and using the sideband messaging channel to send a synced reset message to the non-master chipsets, wherein each of the non-master chipsets asserts a partition reset signal.

Example 16 includes the substance of the exemplary method of Example 13, wherein coordinating the ungraceful synchronized reset flow among all chipsets and processors includes: receiving a synced reset request and a reset type on the sideband messaging channel, using the sideband messaging channel to immediately transmit the synced reset request.

Example 17 includes the substance of the exemplary method of any one of Examples 11-13, further including using, by the master chipset, the sideband messaging channel to coordinate a synchronized power state transition flow by receiving a power state transition request and a target power state on the sideband messaging channel, using the sideband messaging channel to instruct the non-master chipsets to do the power state transition, with the target power state, receiving indications on the sideband messaging channel from the non-master chipsets of readiness to transition power state, and using the sideband messaging channel to send a synced power state transition message to the non-master chipsets, wherein each of the non-master chipsets implements the target power state.

Example 18 includes the substance of the exemplary method of any one of Examples 11-13, wherein the master chipset and its connected processors and non-master chipsets include a first partition, the method further including connecting at least one additional partition including an additional non-master chipset coupled to at least one additional processor to the master chipset, and controlling the additional non-master chipset similarly to the at least one non-master chipset in the coordinated boot flow, reset flow, and power state transition flow.

Example 19 includes the substance of the exemplary method of any one of Examples 11-13, further including skipping the probing of the subset of the interfaces to discovery topology when coordinating the synchronized boot flow to boot from a warm reset state, wherein the topology is already known.

Example 20 includes the substance of the exemplary method of any one of Examples 11-13, further including inserting the at least one processor into one of a fixed number of processor sockets on a printed circuit board, and inserting multiple additional processors into multiple other of the fixed number of processor sockets.

Example 21 provides a non-transitory machine-readable medium containing instructions that, when executed by a master chipset connected, using one or more standard interfaces, to at least one processor and at least one non-master chipset, and further connected, using a sideband messaging channel including a multiple-driver sync wire, to the at least one non-master chipset, cause the master chipset to: probe a subset of its multiple interfaces, each interface to connect to one of a non-master chipset and a processor, to discover a topology of connected processors and non-master chipsets, and use the sideband messaging channel to coordinate a synchronized boot flow.

Example 22 includes the substance of the exemplary non-transitory machine-readable medium of Example 21, wherein the master chipset is to use the sideband messaging channel to coordinate the synchronized boot flow by receiving a synced wake signal on the sideband messaging channel, preparing to boot; using the sideband messaging channel to prompt the non-master chipsets to prepare to boot, receiving indications of readiness to boot from the non-master chipsets on the sideband messaging channel, using the sideband messaging channel to instruct the non-master chipsets to boot, receiving indications of boot completion from the non-master chipsets on the sideband messaging channel, and using the sideband messaging channel to issue a synced go message to the non-master chipsets, wherein each of the non-master chipsets deasserts a partition reset signal.

Example 23 includes the substance of the exemplary non-transitory machine-readable medium of Example 21, wherein the master chipset is further to use the sideband messaging channel to coordinate a synchronized reset flow, the synchronized reset flow including a graceful reset when a reset scenario allows time for a handshake among the chipsets, and an ungraceful reset otherwise.

Example 24 includes the substance of the exemplary non-transitory machine-readable medium of Example 23, wherein the master chipset is to use the sideband messaging channel to coordinate the graceful synchronized reset flow by receiving a synced reset request and a reset type on the sideband messaging channel, using the sideband messaging channel to instruct the non-master chipsets to reset, with the reset type, receiving indications of readiness to reset from the non-master chipsets on the sideband messaging channel, and using the sideband messaging channel to send a synced reset message to the non-master chipsets, wherein each of the non-master chipsets asserts a partition reset signal.

Example 25 includes the substance of the exemplary non-transitory machine-readable medium of Example 23, wherein the master chipset is to use the sideband messaging channel to coordinate the ungraceful synchronized reset flow by receiving a synced reset request and a reset type on the sideband messaging channel, using the sideband messaging channel to immediately transmit the synced reset request.

Example 26 includes the substance of the exemplary non-transitory machine-readable medium of any one of Examples 21-23, wherein the master chipset is further to use the sideband messaging channel to coordinate a power state transition flow by receiving a power state transition request and a target power state on the sideband messaging channel, using the sideband messaging channel to instruct the non-master chipsets to do the power state transition, with the target power state, receiving indications on the sideband messaging channel from the non-master chipsets of readiness to transition power state, and using the sideband messaging channel to send a synced power state transition message to the non-master chipsets, wherein each of the non-master chipsets implements the target power state.

Example 27 includes the substance of the exemplary non-transitory machine-readable medium of any one of Examples 21-23, wherein the master chipset is connected to at least one additional partition including an additional non-master chipset coupled to at least one additional processor, and wherein the master chipset is further to control the additional non-master chipset similarly to the at least one non-master chipset in the coordinated boot flow, reset flow, and power state transition flow.

Example 28 includes the substance of the exemplary non-transitory machine-readable medium of any one of Examples 21-23, wherein the multiple-driver sync wire includes a wire coupled to a weak pull-up resistor, the master chipset further to conditionally discharge the wire by one of multiple open-drain transistors, multiple open-collector transistors, and multiple tristate buffers.

Example 29 includes the substance of the exemplary non-transitory machine-readable medium of any one of Examples 21-23, wherein the master chipset is further to skip the probing of the subset of the interfaces to discovery topology when coordinating the synchronized boot flow to boot from a warm reset state, wherein the topology is already known.

Example 30 includes the substance of the exemplary non-transitory machine-readable medium of any one of Examples 21-23, wherein the master chipset is further to probe a subset of a fixed number of processor sockets on a printed circuit board to discover whether a processor is inserted into the socket.

Example 31 provides a apparatus including: a master chipset having multiple interfaces, each interface to connect to one of a processor and a chipset, at least one processor connected to the master chipset, at least one non-master chipset connected to the master chipset, and a sideband messaging channel connecting the master chipset and the non-master chipsets, wherein the sideband messaging channel includes means for multiply-driving a sync wire, wherein the master chipset is to probe a subset of its multiple interfaces to discover a topology of connected processors and non-master chipsets, and use the sideband messaging channel to coordinate a synchronized boot flow.

Example 32 includes the substance of the exemplary apparatus of Example 31, wherein the master chipset is to coordinate the synchronized boot flow by receiving a synced wake signal on the sideband messaging channel, preparing to boot, using the sideband messaging channel to prompt the non-master chipsets to prepare to boot, receiving indications of readiness to boot from the non-master chipsets on the sideband messaging channel, using the sideband messaging channel to instruct the non-master chipsets to boot, receiving indications of boot completion from the non-master chipsets on the sideband messaging channel, and using the sideband messaging channel to issue a synced go message to the non-master chipsets, wherein each of the non-master chipsets deasserts a partition reset signal.

Example 33 includes the substance of the exemplary apparatus of Example 31, wherein the master chipset is further to use the sideband messaging channel to coordinate a synchronized reset flow, the synchronized reset flow including a graceful reset when a reset scenario allows time for a handshake among the chipsets, and an ungraceful reset otherwise.

Example 34 includes the substance of the exemplary apparatus of any one of Examples 31-33, wherein the means for multiply driving the sync wire includes a weak pull-up resistor to pull up the sync wire, and means for conditionally discharging the sync wire.

Example 35 includes the substance of the exemplary apparatus of Example 3, wherein the master chipset is to coordinate the synchronized reset flow among all chipsets and processors by receiving a synced reset request and a reset type on the sideband messaging channel, using the sideband messaging channel to instruct the non-master chipsets to reset, with the reset type, receiving indications of readiness to reset from the non-master chipsets on the sideband messaging channel, and using the sideband messaging channel to send a synced reset message to the non-master chipsets, wherein each of the non-master chipsets asserts a partition reset signal.

Example 36 includes the substance of the exemplary apparatus of Example 34, wherein, in the ungraceful reset scenario, the master chipset is to immediately send the synced reset request to all chipsets on the sideband messaging channel in order to serve as a warning of an imminent reset.

Example 37 includes the substance of the exemplary apparatus of any one of Examples 31-33, wherein the master chipset is further to use the sideband messaging channel to coordinate a synchronized power state transition flow by receiving a power state transition request and a target power state on the sideband messaging channel, using the sideband messaging channel to instruct the non-master chipsets to do the power state transition, with the target power state, receiving indications on the sideband messaging channel from the non-master chipsets of readiness to transition power state, and using the sideband messaging channel to send a synced power state transition message to the non-master chipsets, wherein each of the non-master chipsets implements the target power state.

Example 38 includes the substance of the exemplary apparatus of any one of Examples 31-33, wherein the master chipset and its connected processors and non-master chipsets include a first partition, wherein the apparatus further includes at least one additional partition including an additional non-master chipset coupled to at least one additional processor, wherein the additional non-master chipset is coupled to the master chipset further coordinates the boot flow, the reset flow, and the power state transition flow by the additional non-master chipset.

Example 39 includes the substance of the exemplary apparatus of any one of Examples 31-33, wherein, the master chipset, when coordinating the synchronized boot flow to boot from a warm reset state, is already aware of the topology and is to skip probing the subset of its interfaces to discover the topology.

Example 40 includes the substance of the exemplary apparatus of any one of Examples 31-33, further including a printed circuit board with a fixed number of processor sockets, wherein the at least one processor is inserted into one of the fixed number of processor sockets, and wherein additional processors can be inserted into other ones of the fixed number of processor sockets.

Example 41 provides a system including: a master chipset having multiple interfaces, each interface to connect to one of a processor and a chipset, at least one processor connected to the master chipset, at least one non-master chipset connected to the master chipset, and a sideband messaging channel connecting the master chipset and the non-master chipsets, wherein the master chipset is to probe a subset of its multiple interfaces to discover a topology of connected processors and non-master chipsets, and use the sideband messaging channel to coordinate a synchronized boot flow.

Example 42 includes the substance of the exemplary system of Example 41, wherein the master chipset is to coordinate the synchronized boot flow by receiving a synced wake signal on the sideband messaging channel, preparing to boot, using the sideband messaging channel to prompt the non-master chipsets to prepare to boot, receiving indications of readiness to boot from the non-master chipsets on the sideband messaging channel, using the sideband messaging channel to instruct the non-master chipsets to boot, receiving indications of boot completion from the non-master chipsets on the sideband messaging channel, and using the sideband messaging channel to issue a synced go message to the non-master chipsets, wherein each of the non-master chipsets deasserts a partition reset signal.

Example 43 includes the substance of the exemplary system of Example 41, wherein the master chipset is further to use the sideband messaging channel to coordinate a synchronized reset flow, the synchronized reset flow including a graceful reset when a reset scenario allows time for a handshake among the chipsets, and an ungraceful reset otherwise.

Example 44 includes the substance of the exemplary system of Example 43, wherein, in the graceful reset scenario, the master chipset is to coordinate the synchronized reset flow among all chipsets and processors by receiving a synced reset request and a reset type on the sideband messaging channel, using the sideband messaging channel to instruct the non-master chipsets to reset, with the reset type, receiving indications of readiness to reset from the non-master chipsets on the sideband messaging channel, and using the sideband messaging channel to send a synced reset message to the non-master chipsets, wherein each of the non-master chipsets asserts a partition reset signal.

Example 45 includes the substance of the exemplary system of Example 43, wherein, in the ungraceful reset scenario, the master chipset is to immediately send the synced reset request to all chipsets on the sideband messaging channel in order to serve as a warning of an imminent reset.

Example 46 includes the substance of the exemplary system of Example 41, wherein the master chipset is further to use the sideband messaging channel to coordinate a synchronized power state transition flow by receiving a power state transition request and a target power state on the sideband messaging channel, using the sideband messaging channel to instruct the non-master chipsets to do the power state transition, with the target power state, receiving indications on the sideband messaging channel from the non-master chipsets of readiness to transition power state, and using the sideband messaging channel to send a synced power state transition message to the non-master chipsets, wherein each of the non-master chipsets implements the target power state.

Example 47 includes the substance of the exemplary system of Example 41, wherein the master chipset and its connected processors and non-master chipsets include a first partition, wherein the system further includes at least one additional partition including an additional non-master chipset coupled to at least one additional processor, wherein the additional non-master chipset is coupled to the master chipset further coordinates the boot flow, the reset flow, and the power state transition flow by the additional non-master chipset.

Example 48 includes the substance of the exemplary system of Example 41, wherein the sideband messaging channel further includes a multiple-driver sync wire including a wire coupled to a weak pull-up resistor and which is conditionally discharged by one of multiple open-drain transistors, multiple open-collector transistors, and multiple tristate buffers.

Example 49 includes the substance of the exemplary system of Example 41, wherein, the master chipset, when coordinating the synchronized boot flow to boot from a warm reset state, is already aware of the topology and is to skip probing the subset of its interfaces to discover the topology.

Example 50 includes the substance of the exemplary system of Example 41, further including a printed circuit board with a fixed number of processor sockets, wherein the at least one processor is inserted into one of the fixed number of processor sockets, and wherein additional processors can be inserted into other ones of the fixed number of processor sockets.

Example 51 provides a method including: probing, by a master chipset having multiple interfaces, each interface to connect to one of a processor and a chipset, the master chipset further connected to one or more non-master chipsets by a sideband messaging channel, a subset of the multiple interfaces to discover a topology of connected processors and non-master chipsets, and using, by the master chipset, the sideband messaging channel to coordinate a synchronized boot flow with the one or more non-master chipsets.

Example 52 includes the substance of the exemplary method of Example 51, wherein using the sideband messaging channel to coordinate the synchronized boot flow includes the master chipset: receiving a synced wake signal on the sideband messaging channel, preparing to boot, using the sideband messaging channel to prompt the non-master chipsets to prepare to boot, receiving indications of readiness to boot from the non-master chipsets on the sideband messaging channel, using the sideband messaging channel to instruct the non-master chipsets to boot, receiving indications of boot completion from the non-master chipsets on the sideband messaging channel, and using the sideband messaging channel to issue a synced go message to the non-master chipsets.

Example 53 includes the substance of the exemplary method of Example 51, further including using, by the master chipset, the sideband messaging channel to coordinate a synchronized reset flow, the synchronized reset flow including a graceful reset when a reset scenario allows time for a handshake among the chipsets, and an ungraceful reset otherwise, wherein coordinating the graceful synchronized reset flow includes the master chipset receiving a synced reset request and a reset type on the sideband messaging channel, using the sideband messaging channel to instruct the non-master chipsets to reset, with the reset type, receiving indications of readiness to reset from the non-master chipsets on the sideband messaging channel, and using the sideband messaging channel to send a synced reset message to the non-master chipsets; and wherein coordinating the ungraceful synchronized reset flow includes the master chipset receiving a synced reset request and a reset type on the sideband messaging channel, and using the sideband messaging channel to immediately transmit the synced reset message to the non-master chipsets.

Example 54 provides a method including: using, by a non-master chipset connected to a master chipset and to at least one processor, a sideband messaging channel connected to the master chipset to exchange messages to coordinate a synchronized boot flow, by waiting for and receiving a prompt to prepare to boot, preparing to boot and indicating readiness to boot, waiting for and receiving a prompt to boot, booting and indicating boot completion, and waiting for and receiving a synced go message on the sideband messaging channel, wherein the non-master chipset, in response to the synced go message, is to deassert a reset signal on its partition.

Example 55 includes the substance of the exemplary method of Example 54, further including: using, by the non-master chipset, the sideband messaging channel to exchange messages with the master chipset to coordinate an ungraceful synchronized boot flow, by transmitting, in response to a reset scenario, a reset request and a reset type, waiting for and receiving a prompt to do a reset, with the reset type, preparing to resent and indicating readiness, and waiting for and receiving a synced reset message, wherein the non-master chipset, in response to the synced reset message, is to assert a reset signal on its partition.

Example 56 includes the substance of the exemplary method of Example 54, wherein the sideband messaging channel further connects the non-master chipset to at least one other non-master chipset, the method further including: receiving, on the sideband messaging channel, by the non-master chipset: an indication of an imminent reset from the at least one other non-master chipset, attempting, by the non-master chipset, to prepare to reset, and receiving, by the non-master chipset, a synced reset message from the master chipset using the sideband messaging channel, and wherein the non-master chipset, in response to the synced reset message, is to assert a reset signal on its partition.

Example 57 includes the substance of the exemplary method of Example 54, further including: using, by the non-master chipset, the sideband messaging channel to exchange messages with and to cause the master chipset to coordinate a synchronized power state transition flow, by sending a power state transition request along with a power state transition type: waiting for and receiving a prompt to prepare for the power state transition, along with the power state transition type, preparing to perform power state transition and indicating readiness for the power state transition, and waiting for and receiving a synced power state transition message, and wherein the non-master chipset, in response to the synced power state transition message, is to implement the power state transition.

Example 58 provides an apparatus including: a master chipset connected, using one or more standard interfaces, to a non-master chipset, at least one other non-master chipset, and at least one processor; the master chipset further connected to the non-master chipsets using a sideband messaging channel, wherein the master chipset is to use the sideband messaging channel to exchange messages with the non-master chipsets to implement a coordinated boot flow, a coordinated reset flow, and a coordinated power state transition flow.

Example 59 includes the substance of the exemplary apparatus of Example 58, wherein the sideband messaging channel includes a multiple-driver sync wire including a wire coupled to a weak pull-up resistor and which is conditionally discharged by one of multiple open-drain transistors, multiple open-collector transistors, and multiple tristate buffers.

Example 60 includes the substance of the exemplary apparatus of Example 59, wherein the sideband messaging channel further connects the non-master chipset to the at least one other non-master chipset, and wherein the master chipset is to: receive, using the sideband messaging channel, an imminent reset request from the non-master chipset, and transmit, in response to the imminent reset request and using the sideband messaging channel, a synced reset message to the non-master chipset and the at least one other non-master chipset.

What is claimed is:

1. A system comprising:
a master chipset having multiple interfaces, each interface to connect to one of a processor and a chipset;
at least one processor connected to the master chipset;
at least one non-master chipset connected to the master chipset; and
a sideband messaging channel connecting the master chipset and the non-master chipsets;
wherein the master chipset is to probe a subset of its multiple interfaces to discover a topology of connected processors and non-master chipsets, and use the sideband messaging channel to coordinate a synchronized boot flow, and wherein the master chipset is further to use the sideband messaging channel to coordinate a synchronized reset flow, the synchronized reset flow comprising a graceful reset when a reset scenario allows time for a handshake among the chipsets, and an ungraceful reset otherwise.

2. The system of claim 1, wherein the master chipset is to coordinate the synchronized boot flow by:
receiving a synced wake signal on the sideband messaging channel;
preparing to boot;
using the sideband messaging channel to prompt the non-master chipsets to prepare to boot;
receiving indications of readiness to boot from the non-master chipsets on the sideband messaging channel;
using the sideband messaging channel to instruct the non-master chipsets to boot;
receiving indications of boot completion from the non-master chipsets on the sideband messaging channel; and
using the sideband messaging channel to issue a synced go message to the non-master chipsets;
wherein each of the non-master chipsets deasserts a partition reset signal.

3. The system of claim 1, wherein, in the graceful reset scenario, the master chipset is to coordinate the synchronized reset flow among all chipsets and processors by:
receiving a synced reset request and a reset type on the sideband messaging channel;
using the sideband messaging channel to instruct the non-master chipsets to reset, with the reset type;
receiving indications of readiness to reset from the non-master chipsets on the sideband messaging channel; and
using the sideband messaging channel to send a synced reset message to the non-master chipsets;
wherein each of the non-master chipsets asserts a partition reset signal.

4. The system of claim 1, wherein, in the ungraceful reset scenario, the master chipset is to immediately send the synced reset request to all chipsets on the sideband messaging channel in order to serve as a warning of an imminent reset.

5. The system of claim 1, wherein the master chipset is further to use the sideband messaging channel to coordinate a synchronized power state transition flow by:
receiving a power state transition request and a target power state on the sideband messaging channel;
using the sideband messaging channel to instruct the non-master chipsets to do the power state transition, with the target power state;
receiving indications on the sideband messaging channel from the non-master chipsets of readiness to transition power state; and
using the sideband messaging channel to send a synced power state transition message to the non-master chipsets;
wherein each of the non-master chipsets implements the target power state.

6. The system of claim 5, wherein the master chipset and its connected processors and non-master chipsets comprise a first partition, wherein the system further comprises at least one additional partition comprising an additional non-master chipset coupled to at least one additional processor, wherein the master chipset further coordinates the boot flow, the reset flow, and the power state transition flow of the additional non-master chipset.

7. The system of claim 1, wherein the sideband messaging channel further comprises a multiple-driver sync wire comprising a wire coupled to a weak pull-up resistor and which is conditionally discharged by one of multiple open-drain transistors, multiple open-collector transistors, and multiple tristate buffers.

8. The system of claim 1, wherein the master chipset, when coordinating the synchronized boot flow to boot from a warm reset state, is already aware of the topology and is to skip probing the subset of its interfaces to discover the topology.

9. The system of claim 1, further comprising a printed circuit board with a fixed number of processor sockets, wherein the at least one processor is inserted into one of the fixed number of processor sockets, and wherein additional processors can be inserted into other ones of the fixed number of processor sockets.

10. A method comprising:
probing, by a master chipset having multiple interfaces, each interface to connect to one of a processor and a chipset, the master chipset further connected to one or more non-master chipsets by a sideband messaging channel, a subset of the multiple interfaces to discover a topology of connected processors and non-master chipsets; and
using, by the master chipset, the sideband messaging channel to coordinate a synchronized boot flow with the one or more non-master chipsets;
wherein using the sideband messaging channel to coordinate the synchronized boot flow comprises the master chipset:
receiving a synced wake signal on the sideband messaging channel;
preparing to boot;
using the sideband messaging channel to prompt the non-master chipsets to prepare to boot;
receiving indications of readiness to boot from the non-master chipsets on the sideband messaging channel;
using the sideband messaging channel to instruct the non-master chipsets to boot;
receiving indications of boot completion from the non-master chipsets on the sideband messaging channel; and
using the sideband messaging channel to issue a synced go message to the non-master chipsets.

11. The method of claim 10, further comprising using, by the master chipset, the sideband messaging channel to coordinate a synchronized reset flow, the synchronized reset flow comprising a graceful reset when a reset scenario allows time for a handshake among the chipsets, and an ungraceful reset otherwise;

wherein coordinating the graceful synchronized reset flow comprises the master chipset receiving a synced reset request and a reset type on the sideband messaging channel, using the sideband messaging channel to instruct the non-master chipsets to reset, with the reset type, receiving indications of readiness to reset from the non-master chipsets on the sideband messaging channel, and using the sideband messaging channel to send a synced reset message to the non-master chipsets; and wherein coordinating the ungraceful synchronized reset flow comprises the master chipset receiving a synced reset request and a reset type on the sideband messaging channel, and using the sideband messaging channel to immediately transmit the synced reset message to the non-master chipsets.

12. A method comprising:

using, by a non-master chipset connected to a master chipset and to at least one processor, a sideband messaging channel connected to the master chipset to exchange messages to coordinate a synchronized boot flow, by:

waiting for and receiving a prompt to prepare to boot;
preparing to boot and indicating readiness to boot;
waiting for and receiving a prompt to boot;
booting and indicating boot completion; and
waiting for and receiving a synced go message on the sideband messaging channel;

wherein the non-master chipset, in response to the synced go message, is to deassert a reset signal on its partition.

13. The method of claim 12, further comprising:

using, by the non-master chipset, the sideband messaging channel to exchange messages with the master chipset to coordinate an ungraceful synchronized boot flow, by:

transmitting, in response to a reset scenario, a reset request and a reset type;

waiting for and receiving a prompt to do a reset, with the reset type;

preparing to reset and indicating readiness; and
waiting for and receiving a synced reset message;

wherein the non-master chipset, in response to the synced reset message, is to assert a reset signal on its partition.

14. The method of claim 12, wherein the sideband messaging channel further connects the non-master chipset to at least one other non-master chipset, the method further comprising:

receiving, on the sideband messaging channel, by the non-master chipset, an indication of an imminent reset from the at least one other non-master chipset;

attempting, by the non-master chipset, to prepare to reset; and receiving, by the non-master chipset, a synced reset message from the master chipset using the sideband messaging channel; and wherein the non-master chipset, in response to the synced reset message, is to assert a reset signal on its partition.

15. The method of claim 12, further comprising:

using, by the non-master chipset, the sideband messaging channel to exchange messages with and to cause the master chipset to coordinate a synchronized power state transition flow, by:

sending a power state transition request along with a power state transition type;

waiting for and receiving a prompt to prepare for the power state transition, along with the power state transition type;

preparing to perform power state transition and indicating readiness for the power state transition; and waiting for and receiving a synced power state transition message;

wherein the non-master chipset, in response to the synced power state transition message, is to implement the power state transition.

16. An apparatus comprising:

a master chipset connected, using one or more standard interfaces, to a non-master chipset, at least one other non-master chipset, and at least one processor;

the master chipset further connected to the non-master chipsets using a sideband messaging channel;

wherein the master chipset is to use the sideband messaging channel to exchange messages with the non-master chipsets to implement a coordinated boot flow, a coordinated reset flow, and a coordinated power state transition flow;

wherein the sideband messaging channel comprises a multiple-driver sync wire comprising a wire coupled to a weak pull-up resistor and to means for conditionally discharging the wire; and wherein the sideband messaging channel further connects the non-master chipset to the at least one other non-master chipset, and wherein the master chipset is to:

receive, using the sideband messaging channel, an imminent reset request from the non-master chipset; and transmit, in response to the imminent reset request and using the sideband messaging channel, a synced reset message to the non-master chipset and the at least one other non-master chipset.

* * * * *